United States Patent
Anderson et al.

(10) Patent No.: US 12,265,762 B1
(45) Date of Patent: Apr. 1, 2025

(54) HUMAN MACHINE TEACHING SYSTEM FOR SEQUENTIAL TASK TRAINING

(71) Applicant: HRL Laboratories, LLC, Malibu, CA (US)

(72) Inventors: Myana Anderson, Minneapolis, MN (US); Tiffany Hwu, San Diego, CA (US); Steven W. Skorheim, North Hills, CA (US); David J. Huber, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 891 days.

(21) Appl. No.: 17/411,053

(22) Filed: Aug. 24, 2021

Related U.S. Application Data

(60) Provisional application No. 63/118,263, filed on Nov. 25, 2020.

(51) Int. Cl.
*G06F 30/27* (2020.01)
*G05B 13/02* (2006.01)
*G05B 13/04* (2006.01)
*G06F 30/12* (2020.01)
*G06N 5/02* (2023.01)
*G06F 119/02* (2020.01)

(52) U.S. Cl.
CPC ......... *G06F 30/27* (2020.01); *G05B 13/0265* (2013.01); *G05B 13/041* (2013.01); *G06F 30/12* (2020.01); *G06N 5/02* (2013.01); *G06F 2119/02* (2020.01)

(58) Field of Classification Search
CPC .......... G06F 30/00; G06F 30/27; G06F 30/12; G06F 2119/02; G05B 13/0265; G05B 13/041; G06N 5/02

USPC ............................................................. 703/6
See application file for complete search history.

(56) References Cited

U.S. PATENT DOCUMENTS 10,935,938 B1 * 3/2021 Bertram ................... G06N 3/08

FOREIGN PATENT DOCUMENTS

WO      WO-2020026235 A1 *  2/2020  ............. G06F 3/011

OTHER PUBLICATIONS

Gonzales, Avelino et al, "Automated Exercise Program in Simulation-Based Training", Jun. 1994, IEEE Transactions on Systems, Man, And Cybernetics, vol. 24, No. 6, IEEE. (Year: 1994).*

(Continued)

*Primary Examiner* — Cedric Johnson
(74) *Attorney, Agent, or Firm* — TOPE-MCKAY & ASSOCIATES

(57) ABSTRACT

Described is a system for improving machine operation performance. The system assigns and displays, on an interface having multiple interactive controls, a performance score for each skill of a sequential task in a simulation of operation of a machine. Based on the performance scores, one or more skills to improve with targeted training are identified and displayed on the interface. A training scenario of skills to perform via the interactive controls in a subsequent simulation is recommended to improve the performance scores. Following performance of the training scenario in the subsequent simulation, the system assigns and displays, on the interface, a new performance score for each skill performed. The training scenario is adapted based on the new performance scores.

14 Claims, 24 Drawing Sheets

(56) References Cited

OTHER PUBLICATIONS

Alreshidi, Ibrahim M et al., "Miscellaneous EEG Preprocessing and Machine Learning for Pilots' Mental States Classification: Implications", Oct. 21-23, 2022, ICA AI 2022, Association for Computing Machinery. (Year: 2022).*

Anderson et al. in "Cognitive Tutor: Lesson Learned", The Journal of the Learning Sciences, 4(2): pp. 167-207.

Lloyd in "Least Squares Quantization in PCM", IEEE Transactions on Information Theory, 28(2), pp. 129-137.

* cited by examiner

| Phase | Metric | Equation |
|---|---|---|
| Orient aircraft | Distance (in Feet) from airport on entering landing cone (Must be pointing toward landing cone) | (Min(Dorient,Dsufcone)-Dsufcone) *α |
| Maintain velocity | Mean deviance from target velocity Over last X minutes before landing (Vref = value calculated for each particular plane with particular weight) | Sum(Abs(V-(Vref+7))) /T *-β (How well they stay near that velocity) How long it takes to get to Vref (alternate) |
| Rate of descent | Mean distance from Target rate Over last X minutes of landing (Rtarget 500 ft/min) | Sum(Abs(R-Rtarget)) /T *-γ |
| Reduce velocity | Distance at which maximum acceptable velocity is obtained for landing | (Min(Dslowed,Dsuffslowed) -Dsufslowed) *ρ |
| Touchdown | Distance in feet from start of runway plane, at which plane is below 60kt and on runway. Maximum force on landing gear | Xlanded*-δ+Max(Fgear)*-ε |

FIG. 13

| Glossary | |
|---|---|
| Landing cone | The cone shaped area being projected from the target landing site to the direction of the aircraft to determine proper distance to prepare for landing. |
| Dorient | Pilot's current distance from the airport |
| Dsufcone | Max distance the aircraft can be from the airport to consider a perfect landing |
| V | Airspeed (velocity, knts) |
| Vref | The target velocity at which the pilot should maintain for proper descent |
| R | Vertical velocity (rate of descent, fpm) |
| Rtarget | The target rate of descent at which the pilot should maintain for proper descent |
| Dslowed | The pilot's distance from the airport at which they have reached acceptable velocity for landing |
| Dsufslowed | The distance from the airport at which maximum acceptable velocity is obtained |
| Xlanded | The distance of the plane from the start of the runway |
| Fgear | The vertical force of the plane when it hits the ground |

FIG. 14

| Variable | X-Plane output | Description |
|---|---|---|
| Time | missn, time | The time since the start of the "mission" (generally the time since the last time an aircraft or location was loaded) |
| Headings | hding, mag | The aircraft's magnetic heading, in degrees |
| Airspeed | Vinf, kias | The craft's indicated airspeed, in knots indicated airspeed |
| Ground speed | Vtrue, ktgs | True airspeed, in knots true ground speed |
| Vertical velocity | VVI, fpm | The aircraft's current vertical velocity, in feet per minute. If everything is working as it should, this is normal to the local horizon under the aircraft |
| Latitude | lat, deg | The aircraft's latitudinal location, in degrees |
| Longitude | lon, deg | The aircraft's longitudinal location, in degrees |
| Altitude (ft msl) | alt, ftmsl | The aircraft's altitude, in feet above mean sea level |
| Altitude (ft gl) | alt, ftgl | The aircraft's altitude, in feet above ground level |
| Vertical force | gear, lb | Vertical force of aircraft |
| Flaps | flap, postn | Flap position |

FIG. 18

| Rank | Variable | Score | Uncertainty | Centrality |
|---|---|---|---|---|
| 1 | Wind | 1.6 | 0.6 | 1.0 |
| 2 | Ice | 1.2 | 0.8 | 0.2 |
| 3 | Flap | 1.0 | 0.8 | 0.2 |
| 4 | Fuel | 0.8 | 0.4 | 0.4 |
| 5 | Yoke | 0.8 | 0.2 | 0.6 |

FIG. 22

HUMAN MACHINE TEACHING SYSTEM FOR SEQUENTIAL TASK TRAINING

CROSS-REFERENCE TO RELATED APPLICATIONS

This is a Non-Provisional Application of U.S. Provisional Application No. 63/118,263, filed in the United States on Nov. 25, 2020, entitled, "A Human Machine Teaching System for Sequential Task Training," the entirety of which is incorporated herein by reference.

BACKGROUND OF INVENTION

(1) Field of Invention

The present invention relates to a system for improving machine operation performance and, more particularly, to a system for improving machine operation performance with sequential task training.

(2) Description of Related Art

Any operation of a machine by a human requires training, and the required amount of training increases with the complexity of the machine and environment. In order to understand the controls of the machine and how they enact change upon an environment, a conceptual understanding of the causality of one's actions is necessary.

Automated tutorial programs are widespread and many test to identify problem areas for further training. However, existing programs have difficulty distinguishing between sub-skills that are performed concurrently, and/or they expend more of the training time testing specific sub-skills rather than broader concepts. The existing tutorial programs are less adaptable and generalizable to improving performance on different, but overlapping, tasks. Machine learning can allow training to be refocused without losing training time on additional testing.

Previous adaptive training programs, such as the Cognitive Tutor, rely on ACT-R models, which are models of human memory, of the student to develop a representation of the student's knowledge. The Cognitive Tutor is described by Anderson et al. in "Cognitive Tutor: Lesson Learned", The Journal of the Learning Sciences, 4(2): 167-207, which is hereby incorporated by reference as though fully set forth herein. The adaptive training programs then attempt to correct that model through data collected from the student. The FlightSmart system from FlightSafety, located at 290 Broadhollow Road, Suite 402 E, Melville, NY 11747, incorporates machine learning into analyzing student capabilities and optimizing training but is primarily concerned with identifying technical elements of the training rather than identifying areas of conceptual weakness.

Thus, a continuing need exists for a system that uses machine learning and conceptual teaching to create a training program that is tailored to individual performance.

SUMMARY OF INVENTION

The present invention relates to a system for improving machine operation performance and, more particularly, to a system for improving machine operation performance with sequential task training. The system comprises an interface having a plurality of interactive controls and one or more processors and a non-transitory computer-readable medium having executable instructions encoded thereon such that when executed, the one or more processors perform multiple operations. The system assigns and displays, on the interface, a performance score for each skill of a sequential task in a simulation of operation of a machine. Based on the performance scores, the system identifies and displays, on the interface, one or more skills to improve with targeted training. Based on the one or more identified skills, a training scenario comprising one or more skills to perform via at least one of the plurality of interactive controls in a subsequent simulation is selected to improve the performance scores. Following performance of the training scenario in the subsequent simulation, the system assigns and displays, on the interface, a new performance score for each skill performed. The training scenario is adapted based on the new performance scores.

In another aspect, the machine is an airplane.

In another aspect, the system uses k-means clustering to determine boundaries of phases of the sequential task; obtains a time sequence of segments based on the determined boundaries; and determines a set of metric functions, each metric function associated with a segment position on a segment.

In another aspect, the system processes a set of multi-dimensional data points with the k-means clustering algorithm; and uses the set of metric functions and segment positions to compute the performance scores along the segment positions.

In another aspect, the system learns a hierarchical task decomposition of the sequential task, wherein the hierarchical task decomposition comprises a hierarchical sequence of the phases of the sequential task and simulation variables, wherein the performance scores are associated with the hierarchical task decomposition. The system receives, as input, a knowledge graph comprising a plurality of layers of nodes representing operation of the machine, wherein each simulation variable is represented as a node with variable dependencies represented by arrows, and wherein the set of metric functions are associated with the knowledge graph.

In another aspect, using the task decomposition and the knowledge graph, one or more simulation variables that are relevant to a phase of the sequential task having the lowest performance score are determined, a set of relevant simulation variables in the knowledge graph that have variable dependencies to the one or more determined simulation variables are identified; a collection of scenario types from the set of relevant simulation variables is generated; the collection of scenario types is ranked and scored; and a training scenario is generated using a highest ranked scenario type.

In another aspect, a first control layer of the knowledge graph comprises first simulation variables, wherein a second mechanics layer of the knowledge graph comprises second simulation variables of mechanical components of the machine that are impacted by the first simulation variables, wherein a third forces layer of the knowledge graph comprises third simulation variables representing forces that the mechanical components enact on the machine, and wherein a fourth external factors layer of the knowledge graph comprises fourth simulation variables from external factors that also impact forces enacted on the machine.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 13 is a table illustrating metrics of phases according to some embodiments of the present disclosure;

FIG. 14 is a table illustrating terms used in the metrics calculations according to some embodiments of the present disclosure;

FIG. 18 is a table illustrating definitions of variables used in a simulation according to some embodiments of the present disclosure;

FIG. 22 is a table illustrating the ranking the variables for generating training scenarios according to some embodiments of the present disclosure.

DETAILED DESCRIPTION

Figure 1:
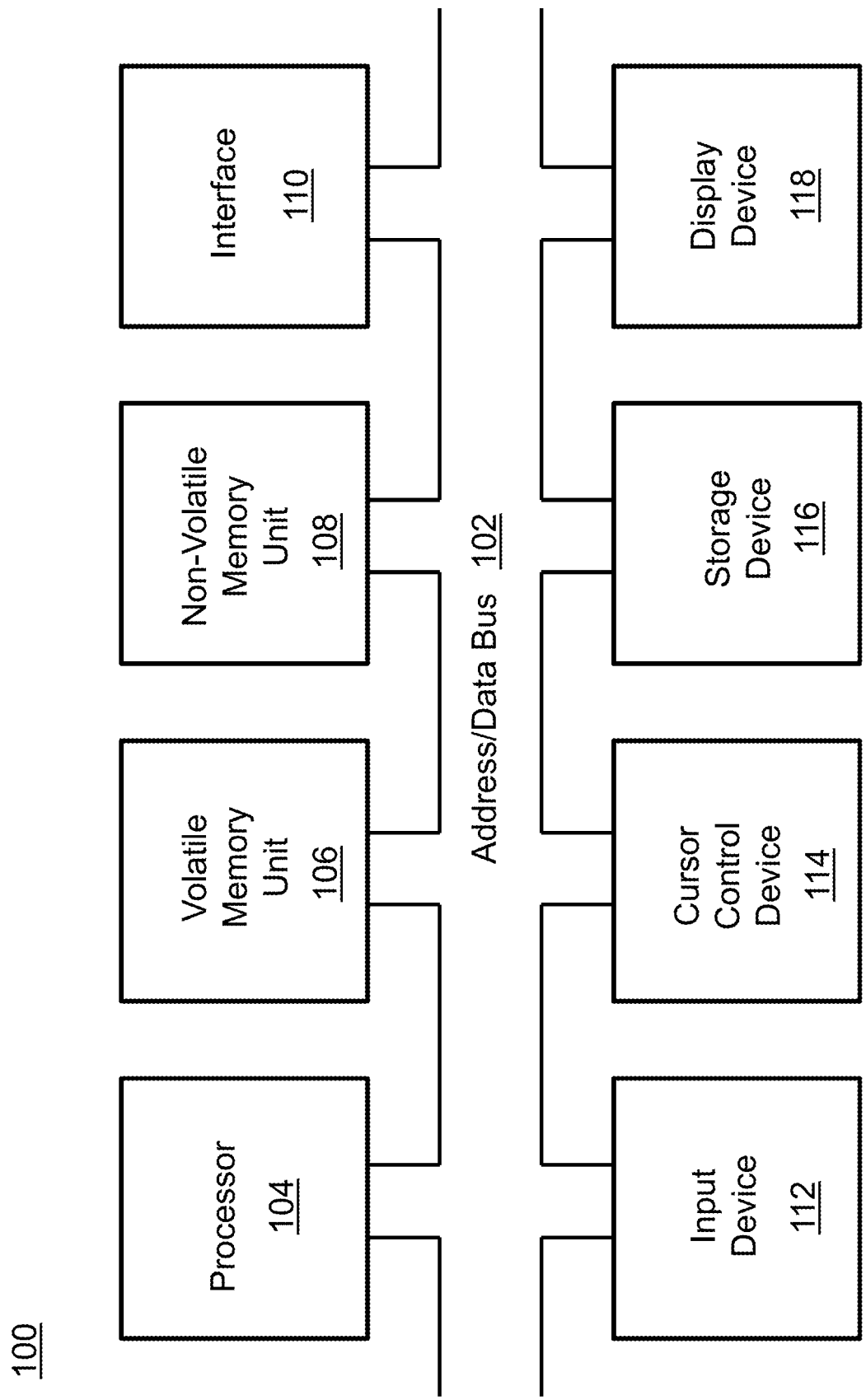
FIG. 1 is a block diagram depicting the components of a system for improving machine operation performance according to some embodiments of the present disclosure.

The present invention relates to a system for improving machine operation performance by a user and, more particularly, to a system for improving machine operation performance by a user with sequential task training. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for improving machine operation performance by a user. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform (e.g., one or more autonomous vehicles), or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
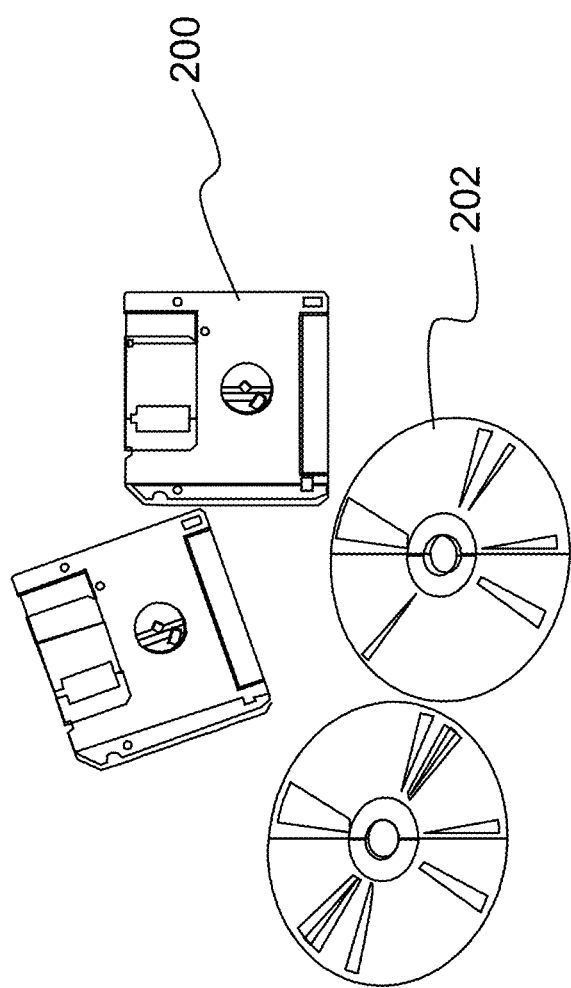
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

The invention described herein is an automated human machine teaching system that focuses on teaching the concepts and causality behind the use of the machine. By using this invention, the amount of time it takes to learn a machine operation task can be drastically reduced. The teaching system according to embodiments of the present disclosure can be implemented on the very machine that the human is learning to use, promoting stronger human-machine teaming. The present invention provides advantages over currently existing intelligent training software by using machine learning and conceptual teaching to create a training program that is tailored to individual performance. Compared with existing systems of augmented learning systems, such as the Cognitive Tutor or FlightSafety's Flightsmart, the invention described herein applies the power of machine learning to the development of targeted conceptual learning curricula and procedurally generated training scenarios. The system described herein uses machine learning methods to access not just the overall skill of the student, but the sub-components of those skills that are most in need of improvement. By using fewer assumptions about the cognitive processes that underlie the student's skill, one can better identify and adapt to individual student needs.

The present invention is an automated system for teaching skills so as to optimize training efficiency and generalizability of learned skills. As will be described in detail below, the system monitors trainee performance and intelligently determines the sub-skills in greatest need of more in-depth training. The system then tailors a series of varied training scenarios combined with conceptual explanations of the skill to be focused on, which allows the trainee to focus on understanding the most critical areas of improvement through guided explorations of the causal relationships of their own actions.

The system relies on a machine learning analysis of the actions taken during training to determine which components of the trainee's skill can be improved most readily. This is used to select relevant training explanations and training scenarios. This selection process improves over time as the tutoring system learns by observing the rate of improvement of trainees and adjusting future learning programs. Varied training and conceptual teaching facilitate the learning of skills in a way that is more adaptable. Training that is repetitive and by rote will result in skills that will have a narrower range of application. The present invention identifies and teaches concepts, particularly those related to the trainee's areas of greatest weakness. This is done by matching the sub-skills and trainee sub-scores of a task to a knowledge graph of the system involved in the task, identifying and teaching the concepts in need of improvement. Varied training scenarios centered around an automatically identified sub-skill combine benefits of broad training without losing focus on target areas.

Figure 3:
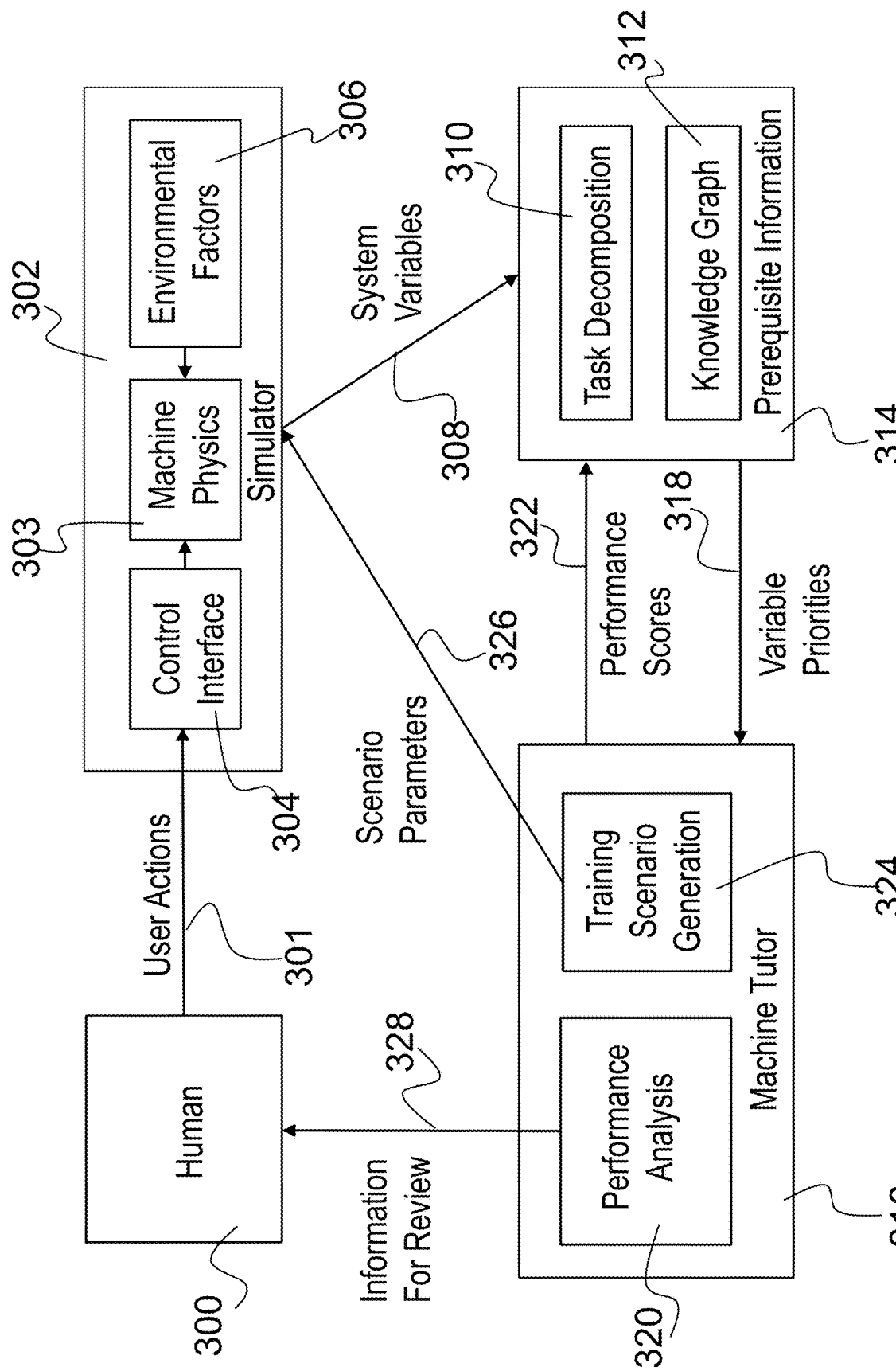
FIG. 3 is an illustration of an overview of a system for improving machine operation performance according to some embodiments of the present disclosure.

FIG. 3 illustrates a system overview diagram of the invention described herein. A human 300 interacts with a simulator 302 (e.g., flight simulator), which models an operable machine (e.g., airplane) in a simulated environment. The simulator 302 consists of a model of the physical forces enacted upon or within the machine, which is controlled by two factors: user actions 301 via a control interface 304 and environmental factors 306, both of which act on machine physics 303 of the simulator 302. From knowledge of the simulation, such as variable names and interactions (i.e., system variables 308), prerequisite representations of a task decomposition 310 and knowledge graph 312 of the system are created. This prerequisite information 314 is given to a machine tutoring system 316 in the form of variable priorities 318. The machine tutoring system 316 analyzes the performance (i.e., performance analysis 320) of the human 300 via the variable priorities 318 and outputs performance scores 322, which are used by the task decomposition 310 and knowledge graph 312 components. The machine tutoring system 316 is used for training scenario generation 324 based on the variable priorities 318 related to weak human performance. Scenario parameters 326 are then sent to the simulator 302 to be used in subsequent simulations. In the following sections, details regarding the format of the task decomposition 310 and knowledge graph 312 and a multi-step cycle that the machine tutor 316 uses for monitoring progress and presenting teaching information for review are provided.

(2.1) Knowledge Graph 312 and Task Decomposition 310

Figure 4:
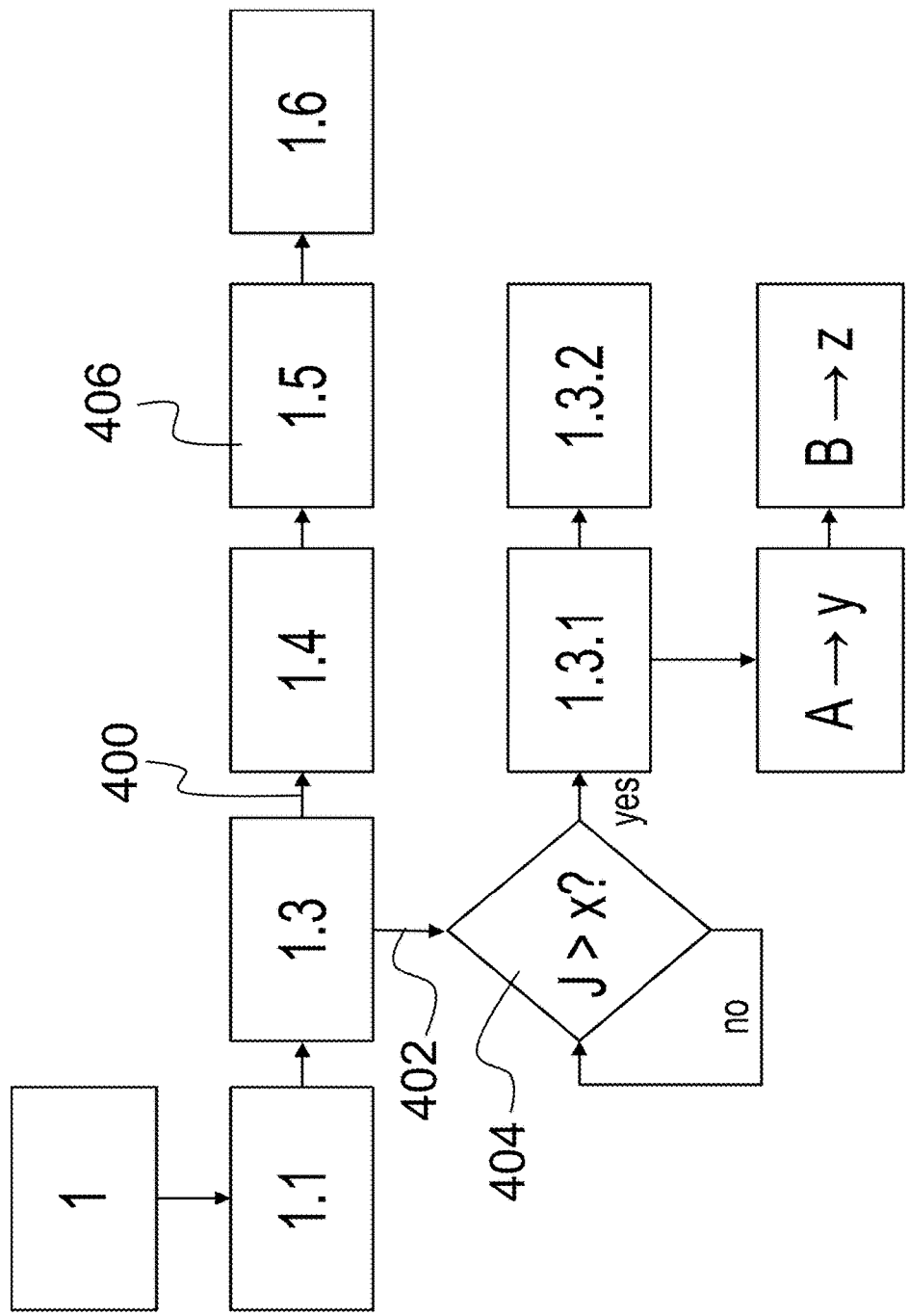
FIG. 4 is an illustration of a generic decomposition of a task according to some embodiments of the present disclosure.

The system described herein takes as input a task decomposition 310 (i.e., a hierarchical decomposition of a task) to be learned and a knowledge graph 312 of the system that have been pre-generated by a system expert or using automated tools for causal inference and hierarchical task breakdown. The task decomposition 310 is provided in the format of a tree-like process flowchart diagram, as shown in FIG. 4, in which horizontally pointing arrows (e.g., arrow 400) show the task sequence and downward arrows (e.g., arrow 402) point towards more detailed sequences of subphases needed to perform the higher order task. The flow diagram also represents diamond-shaped branching points (e.g., diamond 404), in which certain conditions need to be met to determine which of two branches to execute. Each box (e.g., box 406) represents a task or subtask. The boxes (e.g., box 406) are numbered to represent their position in the hierarchical sequence, and capital letters represent layer variables involved in the simulation.

Figure 5:
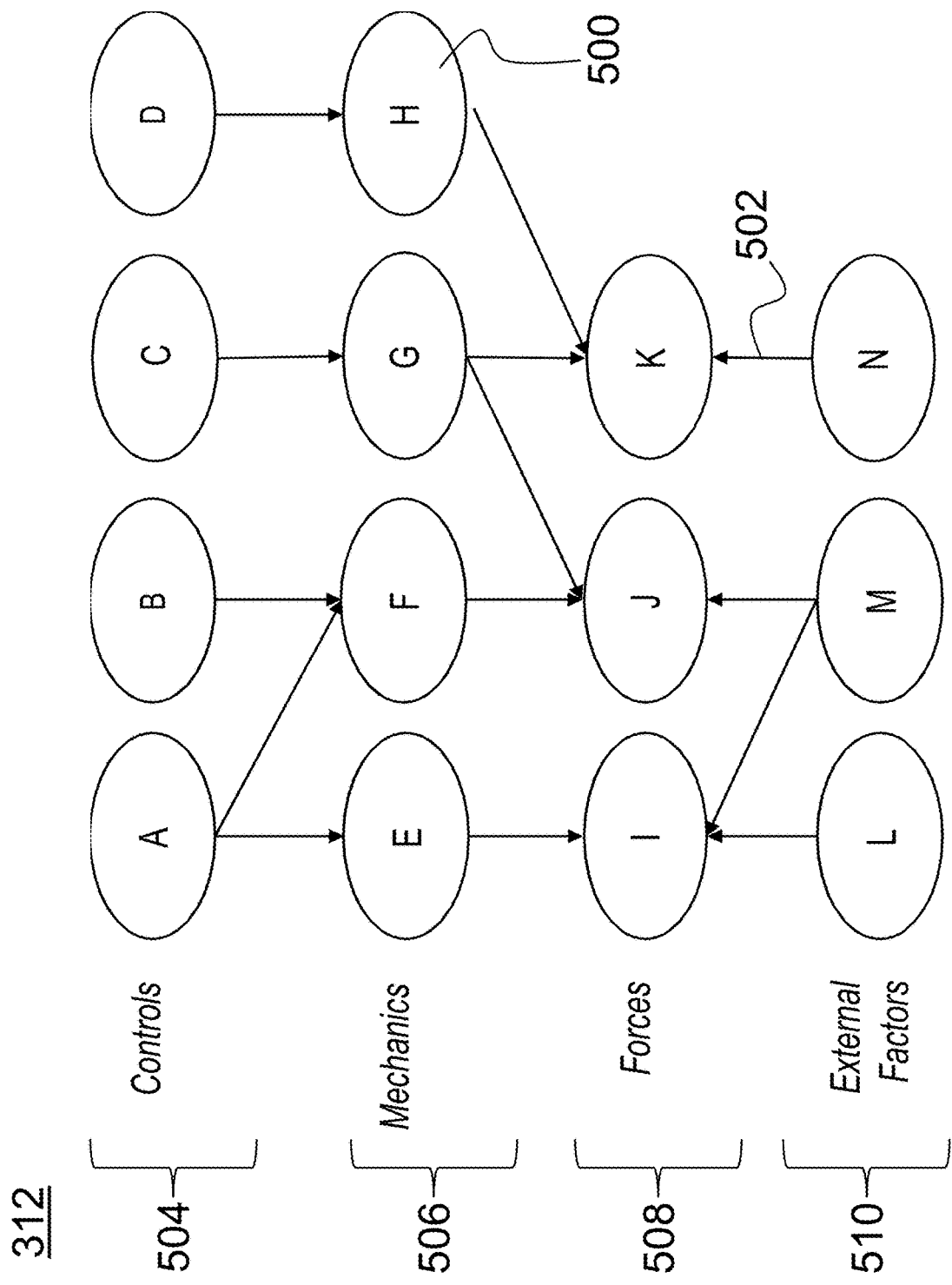
FIG. 5 is an illustration of a knowledge graph according to some embodiments of the present disclosure.

Along with the task decomposition 310, a knowledge graph 312 of the machine operation is also a prerequisite in the present invention, as depicted in FIG. 5. The knowledge graph represents each variable as a node (e.g., node H 500) with its variable dependencies shown by arrows (e.g., arrow 502) and is arranged in four layers (or levels) to fit the operation of a machine. Nodes (e.g., node H 500) point towards other nodes that they influence. The first control layer 504 describes variables that are directly controlled by the user. The second mechanics layer 506 describes the variables of the mechanical parts of the machine that are impacted by the controls. The third forces layer 508 describes the forces that the mechanical parts enact on the body of the machine as a whole. The fourth external factors layer 510 describes variables from external factors outside of the user's control that also impact the forces enacted on the body of the machine. The knowledge graph is designed to work with all possible task decompositions involving the machine, such that any variable involved in a task is also included in the knowledge graph.

(2.2) Teaching Process

Figure 6:
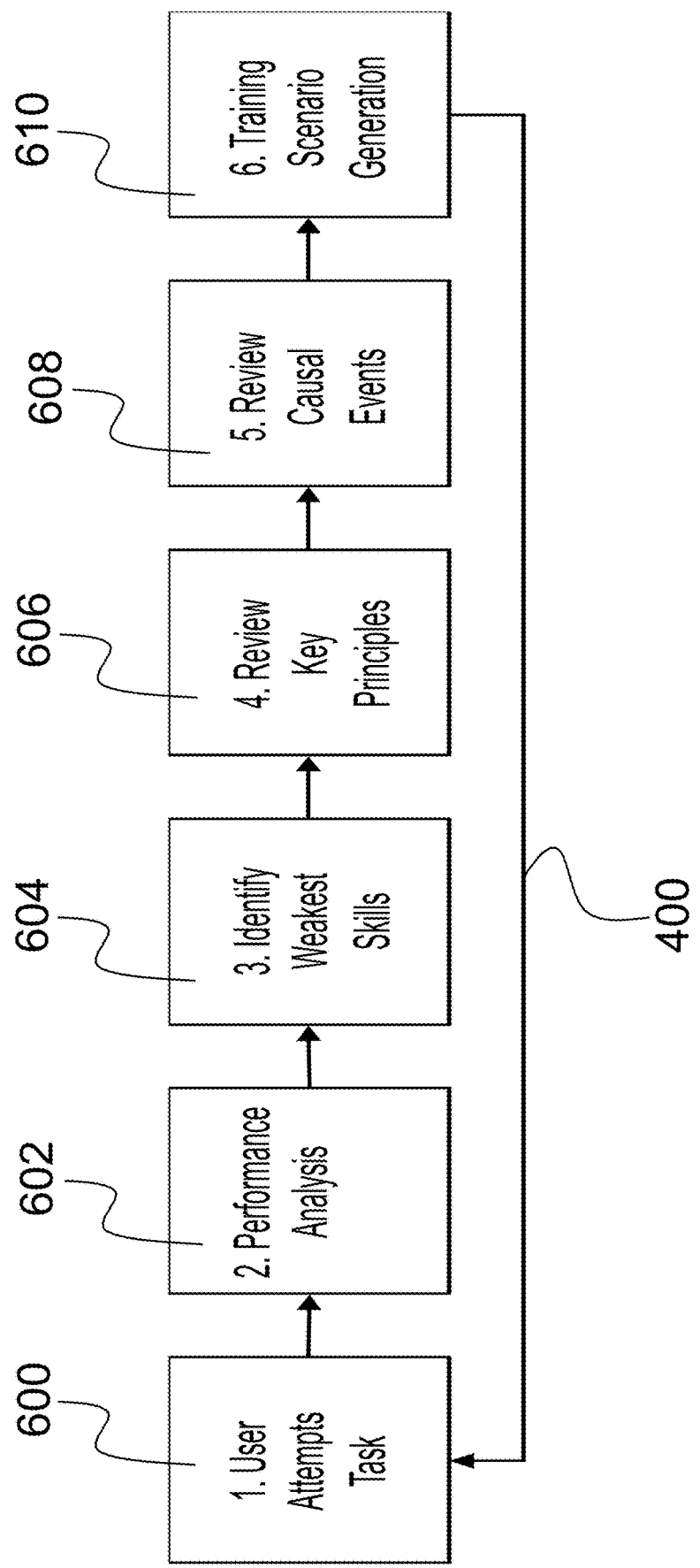
FIG. 6 is an illustration of a cyclic teaching process for improving user operator performance according to some embodiments of the present disclosure.
Figure 16A:
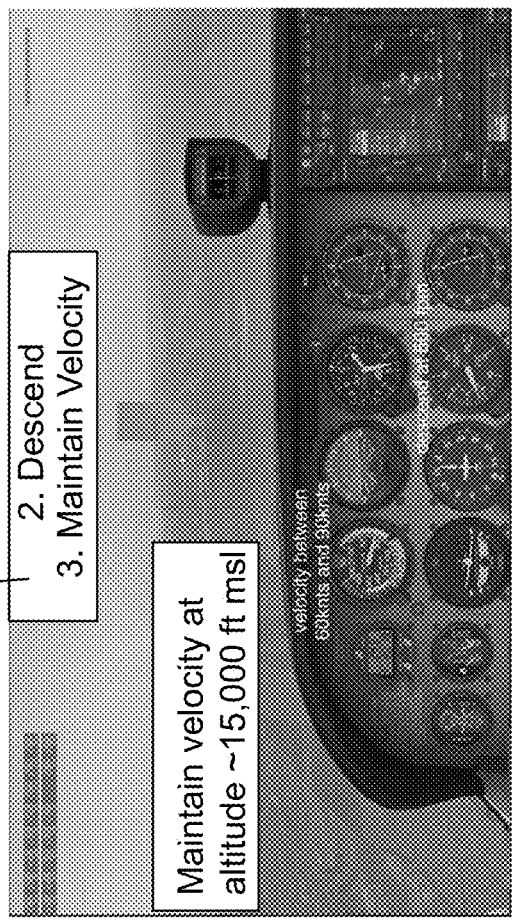
FIG. 16A is an illustration of a screenshot of maintain velocity and descent phases of an expert flight performed in a simulation via the control interface according to some embodiments of the present disclosure.
Figure 16B:
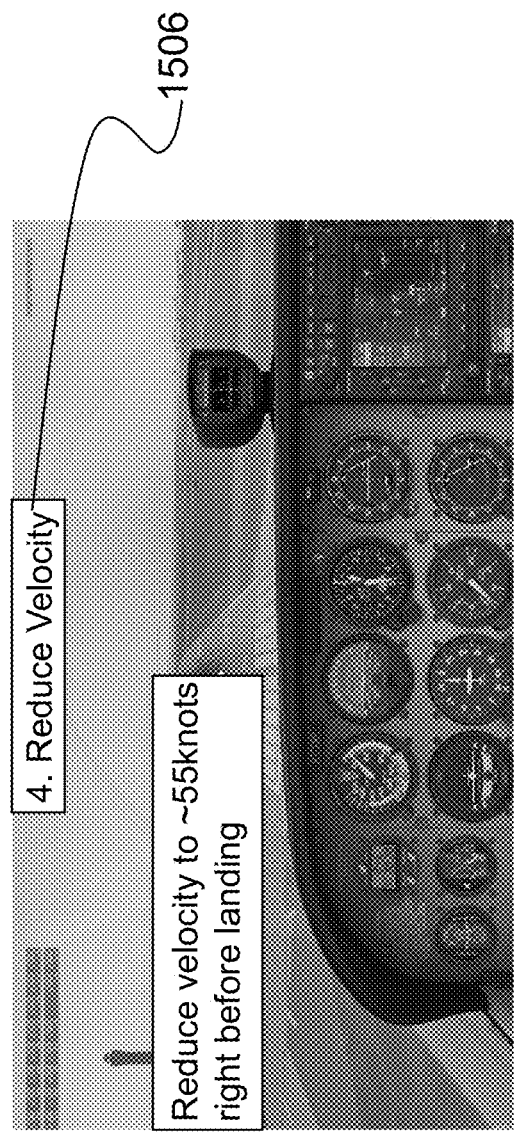
FIG. 16B is an illustration of a screenshot of an expert finding the best distance at which to begin reducing velocity for a steeper descent via the control interface according to some embodiments of the present disclosure.

The system according to embodiments of the present disclosure trains users on tasks involving machine operation for improving user operator performance using the process illustrated in FIG. 6. In a first step 600, a user (e.g., pilot, driver) attempts the full task. In a second step 602, the user's performance is scored for each individual skill in the task (i.e., performance analysis). In a third step 604, based on the scores, the weakest skills are identified to become the focus of targeted training. In a fourth step 606, a set of key principles involved in the user's weakest skills are reviewed with the user via a visualization (see FIG. 10) on a display screen (e.g. computer monitor). In a fifth step 608, a causal chain of events (i.e., effects of each specific type of error), is offered to the user for review. FIGS. 16A and 16B illustrate examples of a causal chain of events that can be shown to the user via a control interface. In a sixth step 610, a custom set of scenarios is generated to address the user's particular areas of difficulty. The invention described herein highlights the second step 602 and the sixth step 610, which employ unique techniques, as will be described in detail below.

(2.2.1) Second Step 602: Scoring Boundaries

When the start and end of each phase and sub-phase can be easily detected and each subphase has a cleanly defined metric, there is no difficulty in providing scores for users who attempt the task. However, accurate detection of phase boundaries and determining the right time to apply metrics is difficult when incoming data is noisy. The system described herein provides a means of learning a signature set of phase transition timings, which serve as boundary markers for phase transitions and anchors for applying metrics.

Figure 7:
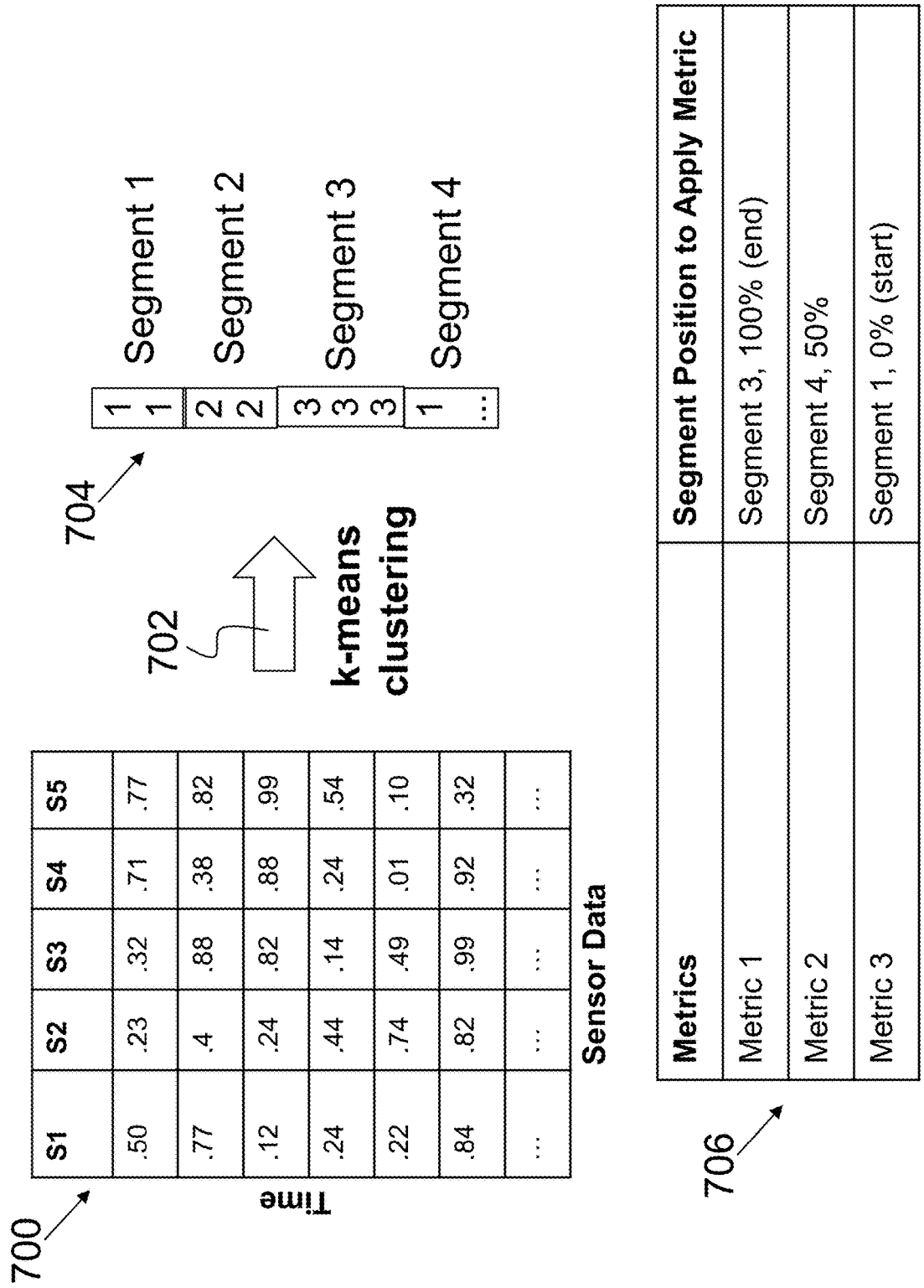
FIG. 7 is an illustration of using clustering to determine phase boundaries to serve as anchors for applying metrics according to some embodiments of the present disclosure.

FIG. 7 illustrates an example of using clustering to determine phase boundaries to serve as anchors for applying metrics. First, sensor and control data are collected from multiple expert users performing the task. The sensor and control data will align with the variables in FIGS. 9B and 21. Non-limiting examples of sensors include an icing sensor and a wind sensor on an aircraft, while non-limiting examples of controls include flap setting commands and yoke position. The sensor readings of each time point for each expert user are expressed as multi-dimensional data points 700, which are used as input to the traditional k-means clustering algorithm 702, with the k value set to the number of phases in the top level of the task representation. The number of phases is determined by a domain expert. In the case of flight training, an expert would set k to be the number of flight phases according to standards described in flight manuals. The time sequence of segments 704 is then compared among the expert users to establish a single segment sequence for the task. Metrics 706 can then be anchored (or associated) to segment IDs and their positions along them, for instance, halfway through the last segment of the task.

The use of metrics 706 and time sequence of segments 704 is a unique application of the pre-existing machine learning technique of k-means clustering (described by Lloyd in "Least Squares Quantization in PCM", IEEE Transactions on Information Theory, 28(2), 129-137, which is hereby incorporated by reference as though fully set forth herein), which is used to form a unique profile of a user's skill on a sequential task.

Figure 8:
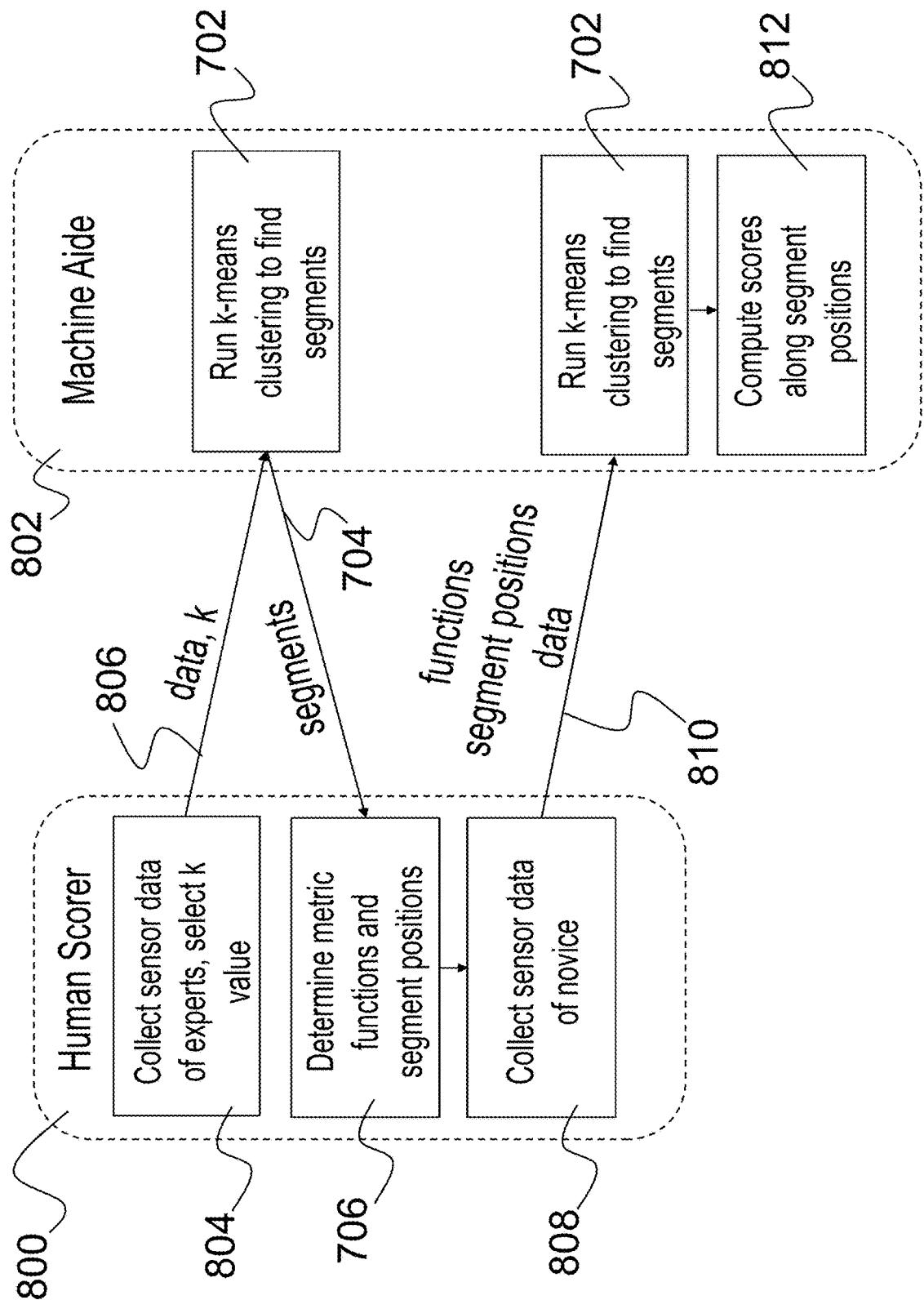
FIG. 8 is an illustration of a process flow of a human scorer interacting with a machine to generate a scoring profile for a novice user completing a sequential task according to some embodiments of the present disclosure.

FIG. 8 depicts the process flow of a human scorer 800 interacting with a machine aide 802 to generate a scoring profile for a novice user completing a sequential task. The machine aide 802 is an auxiliary machine that processes sensor data generated from the main task, similar to the Cognitive Tutor or FlightSmart systems described above. The machine aide 802 is equivalent to the machine tutor 316 in FIG. 3. First, the human scorer 800 collects sensor data of multiple experts 804 completing the same sequential task as multi-dimensional data points 700, shown in FIG. 7. Then, the human scorer 800 (i.e., a human familiar with the task and associated standard procedures) provides a value for parameter k 806 of the k-means clustering algorithm (702 in FIG. 7) according to the number of phases in the task, as determined by a human familiar with the task based on standard procedures. For instance, a task in flight may be associated with an established checklist that contains a known number of steps. The machine aide 802 then uses this information to run the k-means clustering algorithm 702 on the sensor data (i.e., concatenated dataset of all experts) and outputs k time segments of the data 704. The k-means clustering algorithm 702 takes a collection of data points as input and assigns each one a cluster label out of k possible labels. Since the data is organized by time, the times in which the cluster label changes from one value to another forms a segment boundary. The machine aide 802 can, thus, output segment boundaries according to where cluster labels change from one label to another in time. The human scorer 800 then determines metric functions 706, each of which is anchored to a position along a segment. For instance, if the metric is to calculate the average value of a sensor within a time span of one second, this time span can be set to start at a specific position along an existing segment. Next, the human scorer 800 collects sensor data of a novice user 808. The metric functions, segment positions, and data 810 are sent to the machine aide 802, where k-means clustering 702 is run again on the new data, and the machine aide 802 runs the metric functions according to the segment positions to compute scores along segment positions 812.

The following are algorithm descriptions of the two functions performed by the machine aide 802. Steps 1 and 2 of the segmentation using k-means clustering are prior art. All other steps in the algorithms below are unique to the invention described herein.

Segmentation Using k-Means Clustering 702 and 704

Given: Dataset consisting of datapoints of dimension n: $x^{(1)}, x^{(2)}, \ldots, x^{(m)}$ 1. Initialize cluster centroids $\mu_1, \mu_2, \ldots, \mu_k \in \mathbb{R}^n$ randomly
2. Repeat until convergence:
    For every i in 1:m, set class label
    $c^{(i)} := \arg\min_j \|x^{(i)} - \mu_j\|^2$
    For each j in 1: k, set cluster centroid $$\mu_j := \frac{\sum_{i=1}^{m} \{c^{(i)} = j\} x^{(i)}}{\sum_{i=1}^{m} \{c^{(i)} = j\}}$$

Figure 9A:
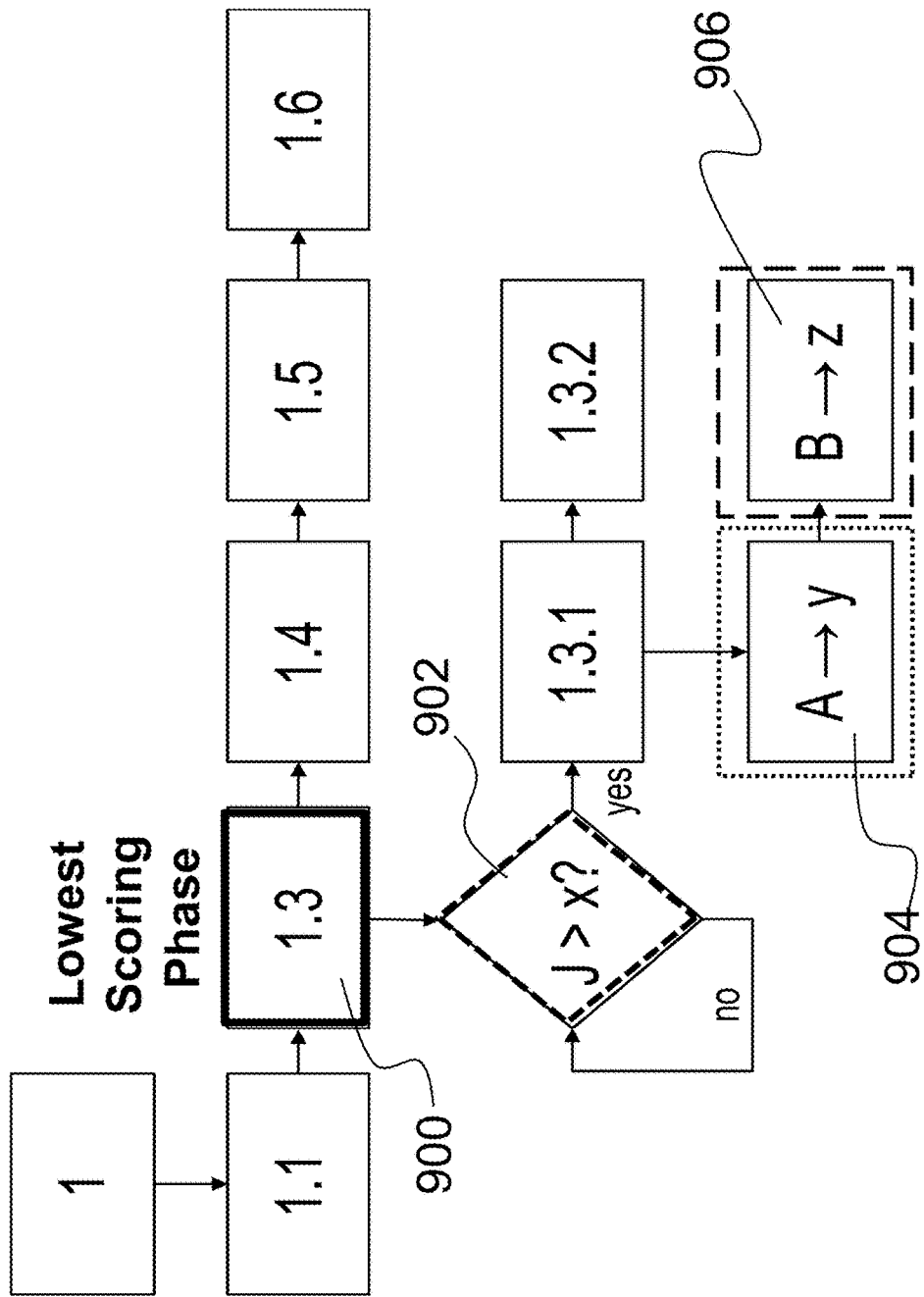
FIG. 9A is an illustration of a task decomposition with variables that match a knowledge graph shown in FIG. 9B according to some embodiments of the present disclosure.
Figure 9B:
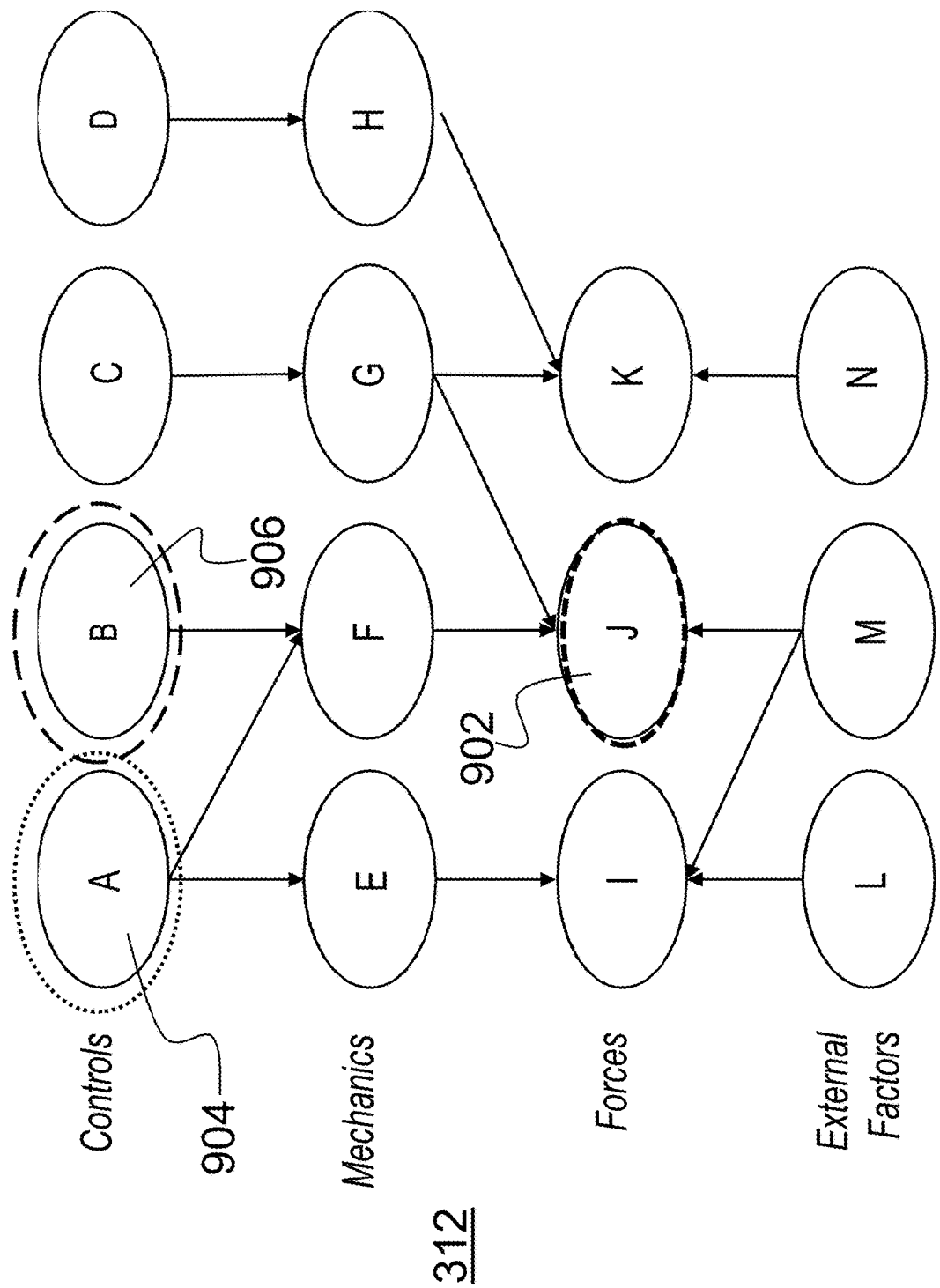
FIG. 9B is an illustration of the knowledge graph with variables that match the task decomposition shown in FIG. 9A according to some embodiments of the present disclosure.

3. Find segments
   Initialize set of segments, S={ } segment
   segment=[1,−1]//[start,end]
   class=$c^{(1)}$
   For each j in 2:m
      If $c^{(j)}$!=class
         segment [2]=j−1//set end of segment
         S.add (segment)
         class=$c^{(j)}$
         segment=[j,−1]
   segment [2]=m//set end of last segment to last datapoint index
   S.add (segment)
   Return: S
Compute Scores Along Segment Positions 810 and 812
   Given: metric functions $f^{(1)}, f^{(2)}, \ldots, f^{(o)}$, segment IDs and positions
   $[s^{(1)}, p^{(1)}], [s^{(2)}, p^{(2)}] \ldots, [s^{(o)}, p^{(o)}]$, dataset consisting of datapoints
   $x^{(1)}, x^{(2)}, \ldots, x^{(m)}$
   scores=[ ]
   For each j in 2:m
      score=$f^{(j)}(s^{(j)}, p^{(j)})$
      scores.add(score)
   Return: scores (2.2.2) Third Through Sixth Steps 604, 606, and 610: Selection of Training Scenarios The next steps involve a series of operations on the task decomposition 310 and knowledge graph 312. The purpose of the task decomposition and knowledge graph are to be used in selection of the training scenario as well as reviewing key principles and causal events. As shown in FIG. 9A, first, the phase containing the lowest average metric score (i.e., lowest scoring phase 900) is selected as the weakest phase in the task decomposition 310, as represented by a bold outline. Matching variables 902, 904, and 906 are denoted by various dashed lines. The identity of the weakest phase (i.e., lowest scoring phase 900) and relevant metrics (nodes/variables 902, 904, and 906) are then shown to the user, as color-matched nodes (represented as corresponding outlines in FIGS. 9A and 9B) between the task decomposition 310 and knowledge graph 312. The task decomposition and knowledge graph are created by experts with task knowledge prior to any training or data analysis.

Figure 10:
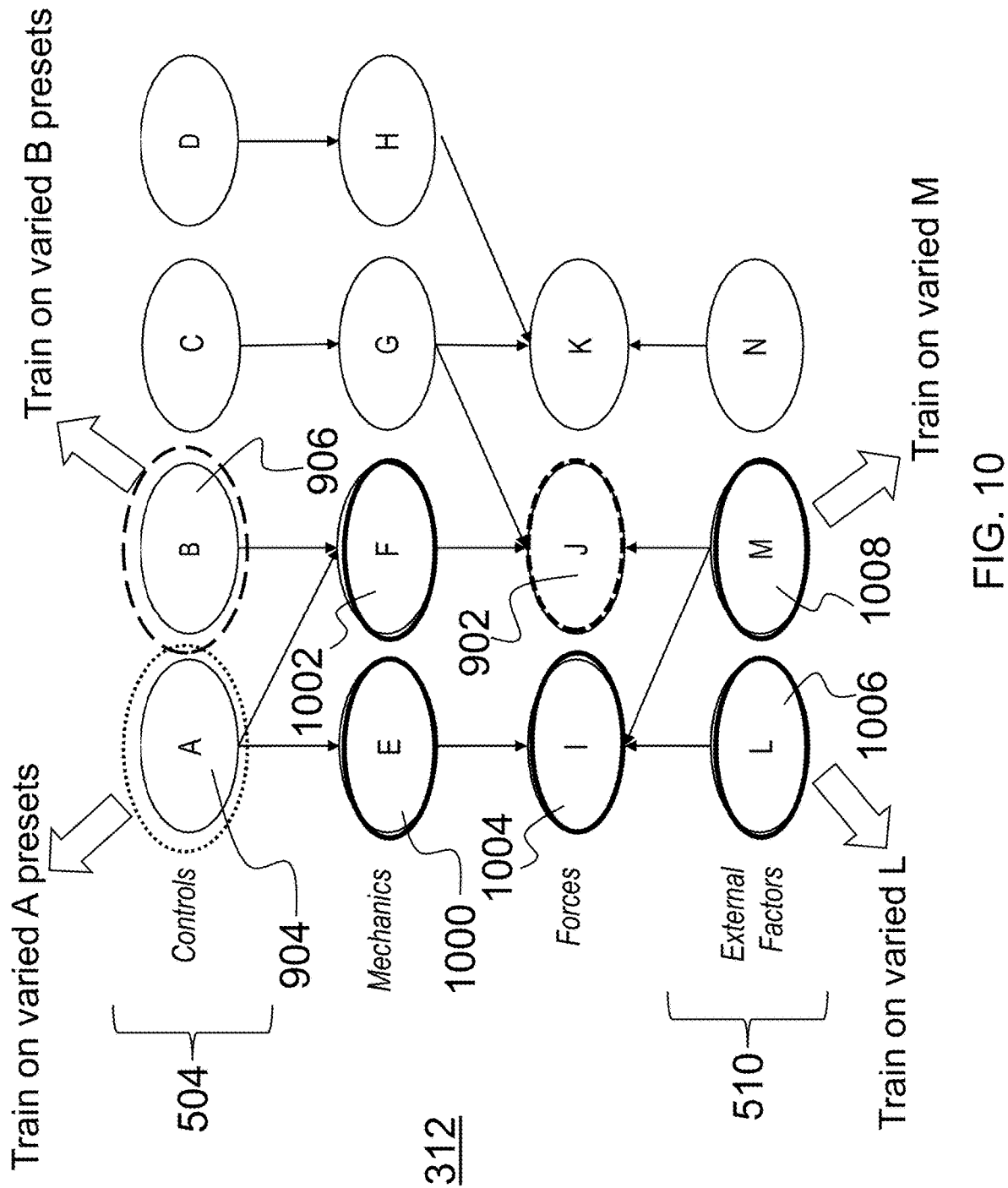
FIG. 10 is an illustration of identification of relevant nodes in a knowledge graph according to some embodiments of the present disclosure.

Next, all relevant nodes in the knowledge graph 312 are identified, as shown in FIG. 10. The relevant nodes are identified by creating a set of nodes of just the highlighted nodes (nodes 902, 904, and 906) in the knowledge graph 312. When there is any node in the set that points to another node not in the set, that other node (nodes 1000, 1002, and 1004) is added to the set. Next, all nodes in the external factors layer 510 that point to any nodes in the set (nodes 1006 and 1008) are also added to the set. The relevant set of nodes (nodes 902, 904, 906, 1000, 1002, 1004, 1006, and 1008) then consists of all variables involved in the subtask. This information is then presented to the user for review.

Each node in the relevant set of nodes that is in the control layer 504 (nodes 904 and 906) or external factors layer 510 (nodes 1006 and 1008) represents a group of scenario types that can be used for training. For instance, if a variable (represented by a node) in the external factors layer 510 is chosen, the user could be presented scenarios in which that variable (e.g., wind) is varied, such that the user can see the cause and effect that this variable exerts upon the system. Given this collection of scenario types, the scenario types are ranked by importance by calculating a score for each group. Each score consists of a weighted combination of uncertainty and centrality. Uncertainty is an external value given by the reliability of the control or variability of external factor. It is a known value external to the present invention, which may be provided through data or statistics. Centrality is the overall dependence of the corresponding node within the knowledge graph, which can be calculated by finding the in-degree or out-degree of the node, or through a more sophisticated algorithm, such as page rank. The score uses two parameters, θ and η, to weight the values to form a single score:

$$score=\theta*uncertainty+\eta*centrality.$$

The group of scenarios with the highest scores is then used to generate a scenario to train the user. This process may be iterated for continued improvement of user performance.

Figure 11:
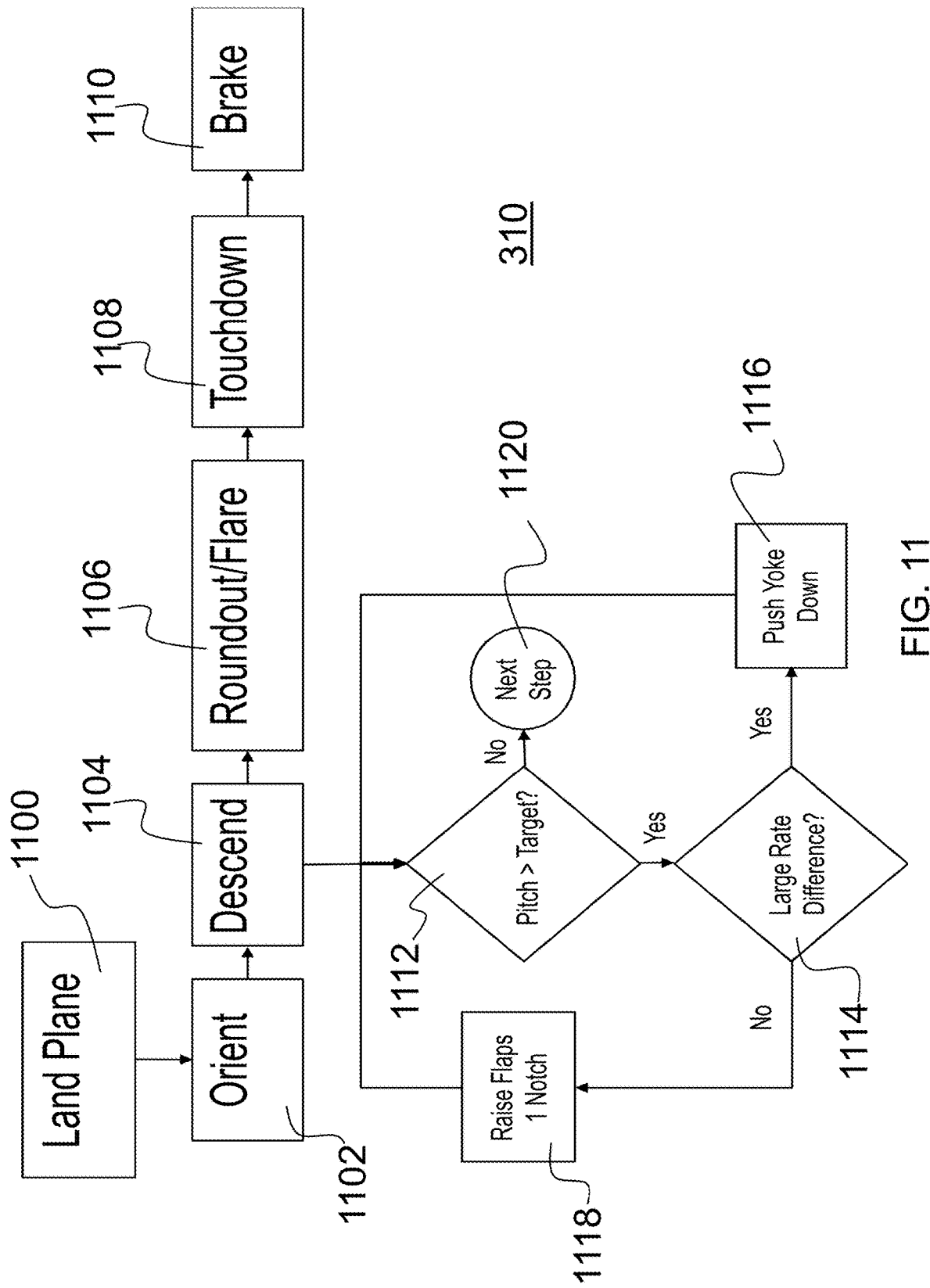
FIG. 11 is an illustration of a landing procedure according to some embodiments of the present disclosure.
Figure 12:
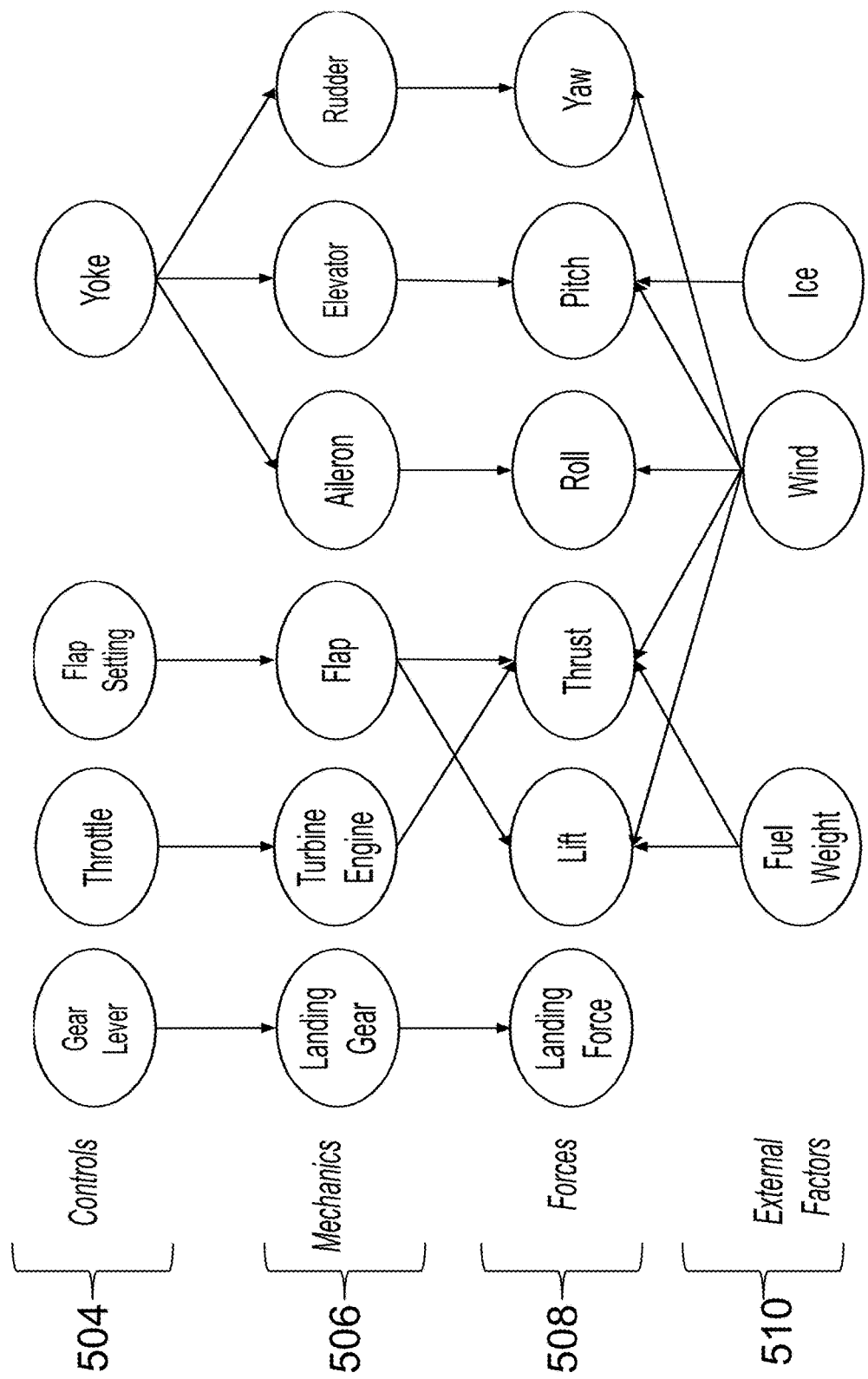
FIG. 12 is an illustration of sensors and control outputs and their relationships to each other in a simulator according to some embodiments of the present disclosure.

The invention was tested in the X-Plane 11 simulator. The X-Plane simulator is a flight simulation engine. In the X-Plane training scenario, the user attempts the application's flight school tutorial "Landing the Cessna 172." The user's performance is then scored based on their ability to go through each landing phase. FIG. 11 depicts a standard landing technique (i.e., land plane 1100) in a landing flowchart, incorporating the actions required at each phase of landing for pilots to check against in each landing phase. The phases include orienting the aircraft (i.e., orient 1102), descend 1104, roundout/flare 1106, touchdown 1108, and brake 1110. For the phase of descend 1104, the first substep 1112 is to compare the pitch of the airplane to the target pitch value. If the pitch exceeds the target, the rate of descent is examined in a second substep 1114. If the rate is large, the yoke is pushed down 1116, and otherwise the flaps are raised one notch 1118. The process continues to loop until the pitch is equal or less than the target, after which the phase ends and continues to the next step 1120. This is accompanied by a knowledge graph 312 of plane operation, shown in FIG. 12, in which the sensor variables in the X-Plane 11 simulation are linked. Specifically, FIG. 12 depicts sensors and control outputs made available in the X-Plane 11 simulation and their relationship to each other. X-Plane 11 makes an abundance of data available from both sensors and controls to allow detection of deviations from ideal landing behavior. The metrics of these phases are scored based on the table in FIG. 13, and FIG. 14 shows a glossary of terms used in the metric calculations.

All scores are then normalized using:

$$X_{new} = \frac{X - X_{min}}{X_{max} - X_{min}},$$

where $X_{new}$ is the normalized value of a score, X is the original value of the score, $X_{min}$ is the minimum possible value of the score, and $X_{max}$ is the maximum possible value of the score.

Figure 15:
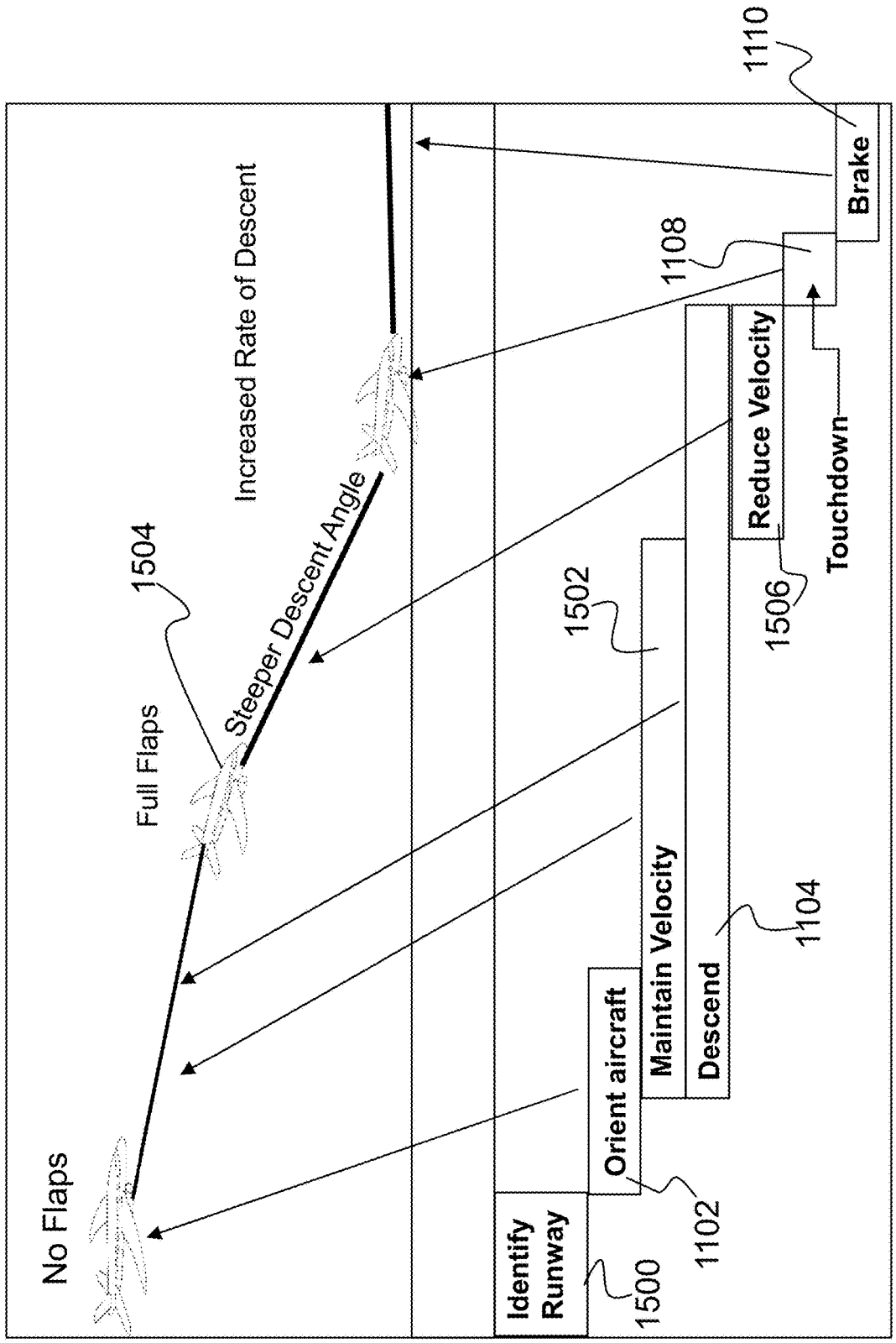
FIG. 15 is an illustration of phases and when they occur during landing according to some embodiments of the present disclosure.

FIG. 15 illustrates a visual breakdown of the phases and when they occur during landing. The phases are defined by elevation and speed, and each phase has its own objectives. The phases begin once the runway is identified (i.e., identify runway 1500). The pilot should orient their aircraft 1102 to be within five degrees of the landing strip. The pilot then attempts to maintain proper velocity 1502 at their target descent rate. It should be noted that the maintain velocity 1502 and descend 1104 phases may begin interchangeably. Once the pilot has reached a certain distance from the landing strip they should be at full flaps 1504 and reducing their velocity 1506 for a proper touchdown 1108. Once the aircraft has touched the ground, the brakes 1110 should be applied.

During the tutorial, an expert's landing would be one where, in the orient aircraft 1102 phase, the plane is within the airport landing cone with orientation within 5 degrees of the landing strip (e.g., 164 degrees). When maintaining velocity 1502, the expert will be able to adjust their throttle so that they stay within 60-90 knots, ideally as close to the target velocity at, for instance, 80 knots. Similarly, the rate of descent 1104 phase will remain close to the target descent rate at 500 feet per minute (fpm). Both the maintain velocity 1502 and descend 1104 phases are noted in the screenshot of an expert flight performed in X-Plane 11 (FIG. 16A). The expert will then find the best distance at which to begin reducing their velocity 1506 to 60 knots for a steeper descent, as shown in FIG. 16B. A couple of ways to determine this are by ground level altitude and full flap release 1504. When approaching touchdown 1108, the expert will touch the ground at about 55 knots, traveling as little distance traveled and vertical force as possible.

Figure 17:
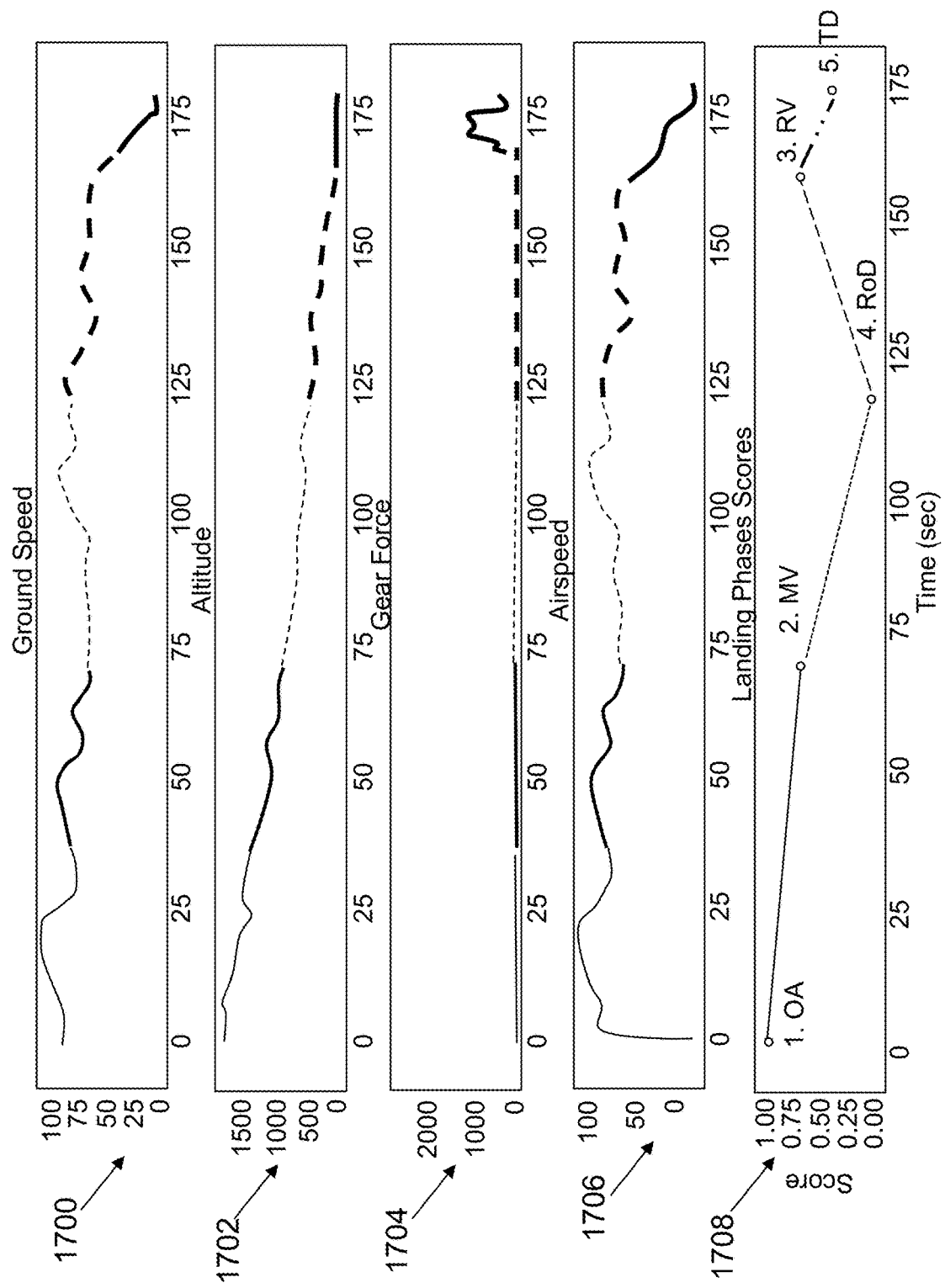
FIG. 17 is an illustration of key measurements in determining landing phase according to some embodiments of the present disclosure.

The expert's flight helps define where each phase occurs by hand. The goal is to use a k-means clustering method to determine when the phases end for scoring a new person using the system, as illustrated in FIGS. 7 and 8. FIG. 17 illustrates key measurements in determining the landing phase. In the figure, the key measurements are designated with different line types; however, for display purposes, the key measurements can be color coded according to an automated assessment of the current phase. In FIG. 17, there are five clusters built on four variables: ground speed 1700, altitude 1702, gear force 1704, and airspeed 1706. The clusters are represented by different line types (e.g., solid, bold, dashed, unbolded) according to an automated assessment of the current phase. When compared to the score graph 1708, one can see that the ends of each cluster line up with the hand computed scoring. The exception here is that the orient aircraft (OA) score occurs very early because the tutorial starts the user by facing the landing strip.

Figure 19:
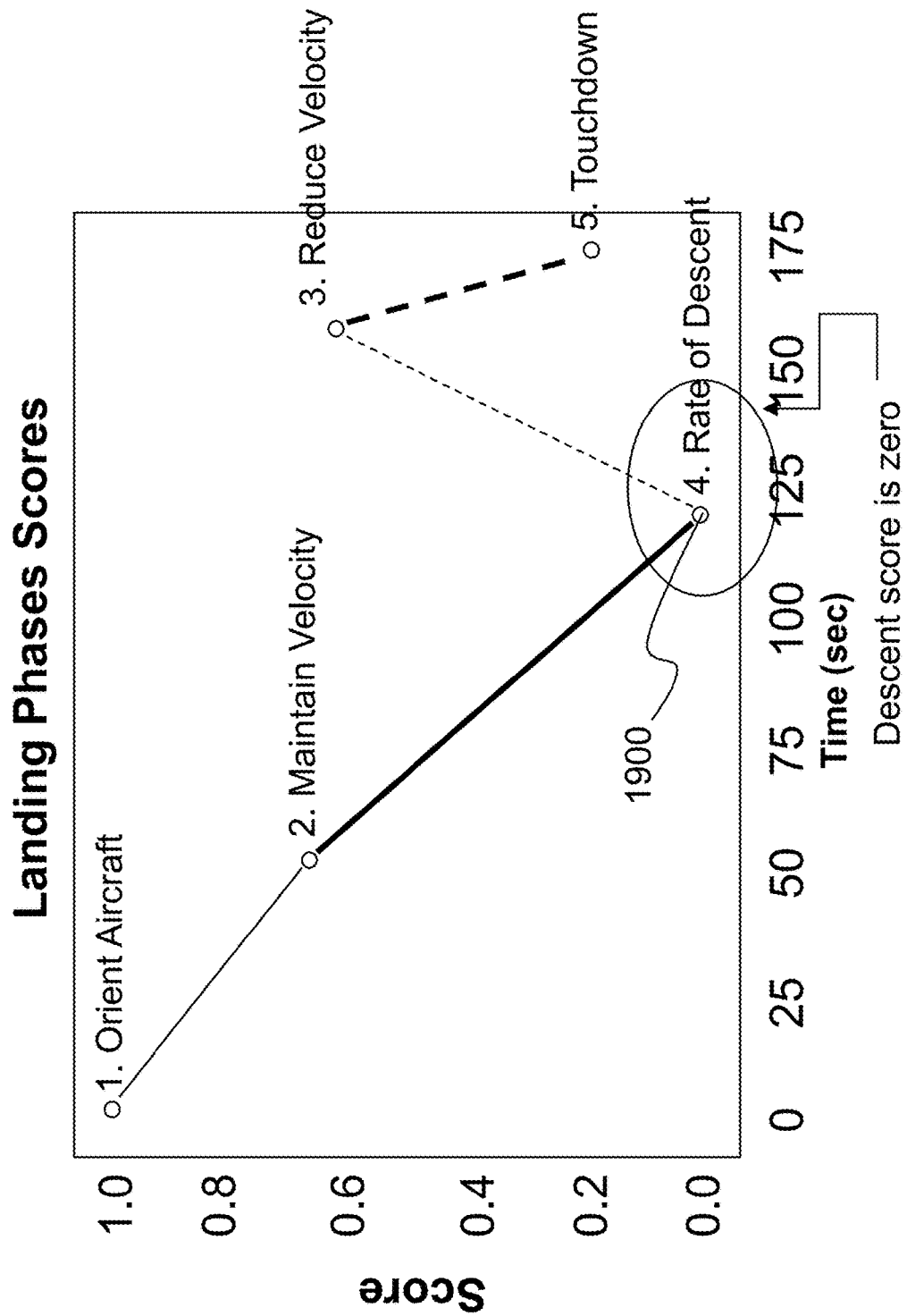
FIG. 19 is a graph depicting a score across a subject's descent according to some embodiments of the present disclosure.
Figure 20:
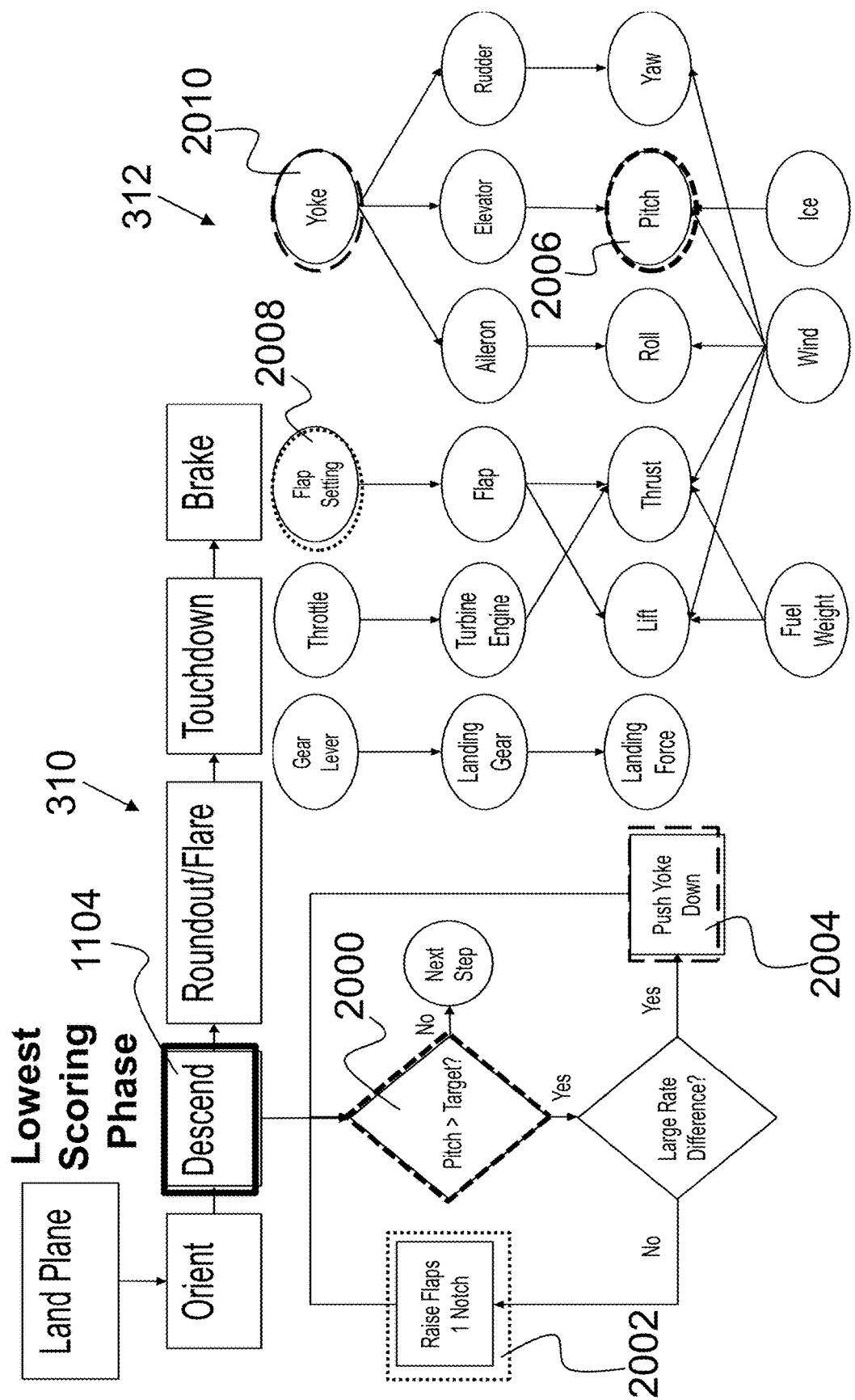
FIG. 20 is a flowchart depicting an illustration of matching variables of the task graph involved with the lowest-scoring phase with their corresponding variables in the knowledge graph according to some embodiments of the present disclosure.
Figure 21:
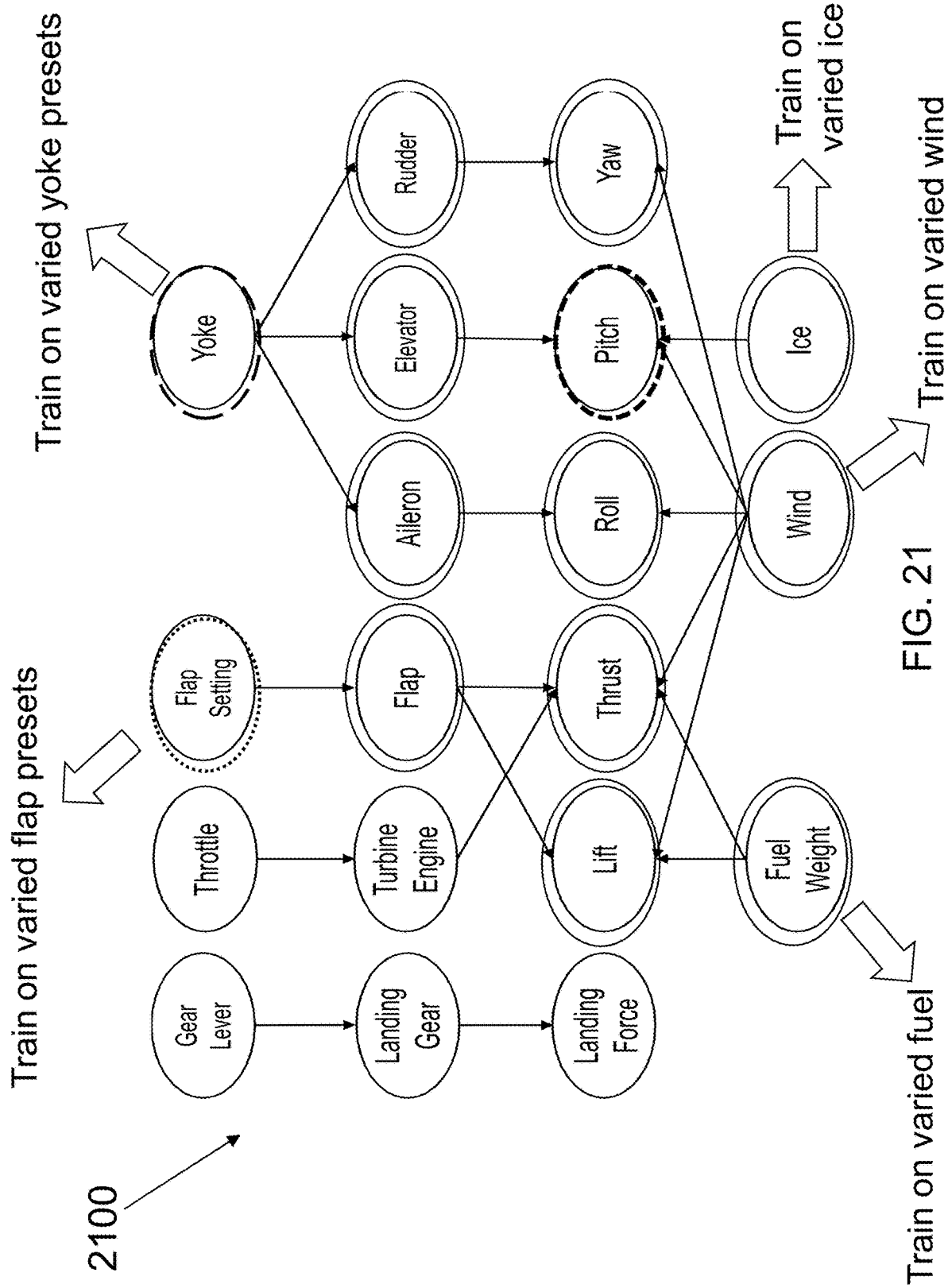
FIG. 21 is an illustration depicting a process flow of the decision process for determining the most urgently necessary phases of training according to some embodiments of the present disclosure.

The following is a non-limiting example of a demonstration of the invention described herein.
1. The user attempts a landing through the "Landing the Cessna 172" tutorial, and data is collected and parsed (Step 1, 600).
2. The user's score is (element 812 in FIG. 8) presented to them for review. FIG. 19 shows a score across a user's descent over the time period of the landing.
3. One can quickly identify that the user scored very poorly on their rate of descent 1900 and use that information to understand why this may have happened and how to improve on it. The variables of the task with the lowest-scoring phase, descend 1104, in the task decomposition 310, including Pitch>Target 2000, Raise Flaps 1 Notch 2002, and Push Yoke Down 2004, are then matched with their corresponding variables in the knowledge graph 312, including Pitch 2006, Flap Setting 2008, and Yoke 2010, as shown in FIG. 20.
4. An annotated skill and knowledge graph is then displayed, which explains the breakdown to the pilot. An example of an annotated skill and knowledge graph 2100 is shown in FIG. 21. The annotated skill and knowledge graph 2100 will show the decision process for determining the most urgently necessary phases of training. For instance, the annotated skill and knowledge graph 2100 in FIG. 21 indicates that there should be more training on varied flap presets, varied yoke presets, varied fuel, varied wind, and varied ice.
5. The variables are then ranked for generating training scenarios based on a prioritization formula (i.e., the score computation described above), as shown in the table of FIG. 22.
6. Since the wind variable has the highest priority in this example (see FIG. 22), it is recommended that the pilot do the scenario again under different wind conditions. Wind adjustments can be made manually via the control interface in future training simulations. This can also be done by setting simulated parameters in an automated fashion.
7. Steps 1 and 2 are repeated for measurement, achieving scores similar to the expert flight example. An expert flight example would have scores that exceed a predetermined threshold value. Therefore, performance scores of a novice that either reach the predetermined threshold value, or are within a predetermined range of the predetermined threshold value, would be considered similar to an expert user.

Figure 23:
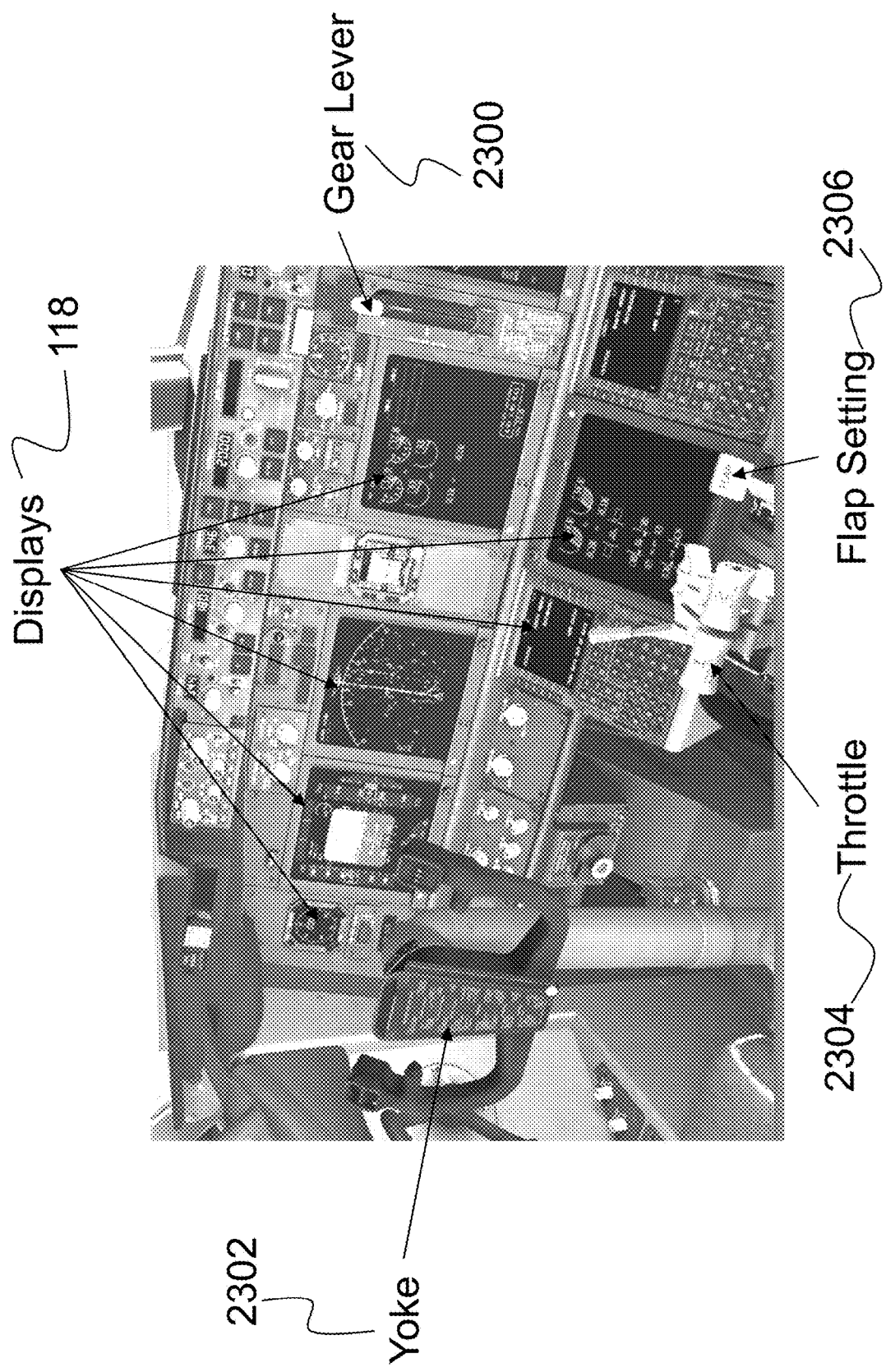
FIG. 23 is an illustration of an interface and interactive controls according to some embodiments of the present disclosure.

The invention described herein can be integrated into planes and/or flight simulators to interact with human pilots in real time. When implemented on physical hardware, the system described herein is part of a physical machine involved in controlling and interacting with other physical machines, such as an aircraft and vehicles. Specifically, the present invention can be physically implemented within a flight system as an improvement upon the functioning of the control interface. On airplanes, or other physical interfaces, a human must interact with the controls of the interface and read sensor information from the interface in order to complete a task. Machine operation performance leads to improved machine performance in that the airplane, or other physical interface, functions better with a better operator. For instance, the present invention drastically decreases the amount of time it takes for a human to learn a task and helps pilots generalize from their training if they encounter unfamiliar contingencies during flight. Principles of the invention described herein can also be applied to the operation of semi-autonomous and manually controlled vehicles, quickly teaching human users how to use the interfaces of these vehicles. An interface that is quickly learned increases product usability and enhances human experience. While the present invention focuses on pilot performance, any interface with interactive controls could apply in a similar manner. FIG. 23 illustrates a non-limiting example of interfaces (e.g., display device 118) and interactive controls. Non-limiting examples of interactive controls include buttons, switches, levers (e.g., gear lever 2300), yokes 2302, throttles 2304, flap settings 2306, pedals, and portions of a display (e.g., touchscreen) that represent interactive controls that can be touched to induce an action in the simulation.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for improving machine operation performance, the system comprising:
an interface having a plurality of interactive controls; and
one or more processors and a non-transitory computer-readable medium having executable instructions encoded thereon such that when executed, the one or more processors perform an operation of:
assigning and displaying, on the interface, a performance score for each skill of a sequential task in a simulation of operation of a machine;
based on the performance scores, identifying and displaying, on the interface, one or more skills to improve with targeted training;
based on the one or more identified skills, recommending a training scenario comprising one or more skills to be performed via at least one of the plurality of interactive controls in a subsequent simulation to improve the performance scores;
following performance of the training scenario in the subsequent simulation, assigning and displaying, on the interface, a new performance score for each skill performed;
adapting the training scenario based on the new performance scores;
using k-means clustering to determine boundaries of phases of the sequential task;
obtaining a time sequence of segments based on the determined boundaries; and
determining a set of metric functions, each metric function associated with a segment position on a segment.

2. The system as set forth in claim 1, wherein the one or more processors further perform operations of:
processing a set of multi-dimensional data points with the k-means clustering algorithm;
using the set of metric functions and segment positions to compute performance scores along the segment positions.

3. The system as set forth in claim 1, wherein the one or more processors further perform operations of:
learning a hierarchical task decomposition of the sequential task, wherein the hierarchical task decomposition comprises a hierarchical sequence of the phases of the sequential task and simulation variables, wherein the performance scores are associated with the hierarchical task decomposition; and
receiving, as input, a knowledge graph comprising a plurality of layers of nodes representing operation of the machine, wherein each simulation variable is represented as a node with variable dependencies represented by arrows, and wherein the set of metric functions are associated with the knowledge graph.

4. The system as set forth in claim 3, wherein the one or more processors further performs operations of:
using the task decomposition and the knowledge graph, determining one or more simulation variables that are relevant to a phase of the sequential task having a lowest performance score;
identifying a set of relevant simulation variables in the knowledge graph that have variable dependencies to the one or more determined simulation variables;
generating a collection of scenario types from the set of relevant simulation variables;
scoring and ranking the collection of scenario types; and
generating a training scenario using a highest ranked scenario type.

5. The system as set forth in claim 3, wherein a first control layer of the knowledge graph comprises first simulation variables, wherein a second mechanics layer of the knowledge graph comprises second simulation variables of mechanical components of the machine that are impacted by the first simulation variables, wherein a third forces layer of the knowledge graph comprises third simulation variables representing forces that the mechanical components enact on the machine, and wherein a fourth external factors layer of the knowledge graph comprises fourth simulation variables from external factors that also impact forces enacted on the machine.

6. A computer implemented method for improving machine operation performance, the method comprising acts of:
assigning and displaying, on an interface having a plurality of interactive controls, a performance score for each skill of a sequential task in a simulation of operation of a machine;
based on the performance scores, identifying and displaying, on the interface, one or more skills to improve with targeted training;
based on the one or more identified skills, recommending a training scenario comprising one or more skills to be performed via at least one of the plurality of interactive controls in a subsequent simulation to improve the performance scores;
following performance of the training scenario in the subsequent simulation, assigning and displaying, on the interface, a new performance score for each skill performed;
adapting the training scenario based on the new performance scores;
using k-means clustering to determine boundaries of phases of the sequential task;
obtaining a time sequence of segments based on the determined boundaries; and
determining a set of metric functions, each metric function associated with a segment position on a segment.

7. The method as set forth in claim 6, wherein the one or more processors further perform operations of:
processing a set of multi-dimensional data points with the k-means clustering algorithm;
using the set of metric functions and segment positions to compute performance scores along the segment positions.

8. The method as set forth in claim 6, wherein the one or more processors further perform operations of:
learning a hierarchical task decomposition of the sequential task, wherein the hierarchical task decomposition comprises a hierarchical sequence of the phases of the sequential task and simulation variables, wherein the performance scores are associated with the hierarchical task decomposition; and
receiving, as input, a knowledge graph comprising a plurality of layers of nodes representing operation of the machine, wherein each simulation variable is represented as a node with variable dependencies represented by arrows, and wherein the set of metric functions are associated with the knowledge graph.

9. The method as set forth in claim 8, wherein the one or more processors further performs of:
using the task decomposition and the knowledge graph, determining one or more simulation variables that are relevant to a phase of the sequential task having a lowest performance score;

identifying a set of relevant simulation variables in the knowledge graph that have variable dependencies to the one or more determined simulation variables;

generating a collection of scenario types from the set of relevant simulation variables;

scoring and ranking the collection of scenario types; and generating a training scenario using a highest ranked scenario type.

10. The method as set forth in claim 8, wherein a first control layer of the knowledge graph comprises first simulation variables, wherein a second mechanics layer of the knowledge graph comprises second simulation variables of mechanical components of the machine that are impacted by the first simulation variables, wherein a third forces layer of the knowledge graph comprises third simulation variables representing forces that the mechanical components enact on the machine, and wherein a fourth external factors layer of the knowledge graph comprises fourth simulation variables from external factors that also impact forces enacted on the machine.

11. A computer program product for improving machine operation performance, the computer program product comprising:

computer-readable instructions stored on a non-transitory computer-readable medium that are executable by a computer having one or more processors for causing the processor to perform operations of:

assigning and displaying, on an interface having a plurality of interactive controls, a performance score for each skill of a sequential task in a simulation of operation of a machine;

based on the performance scores, identifying and displaying, on the interface, one or more skills to improve with targeted training;

based on the one or more identified skills, recommending a training scenario comprising one or more skills to be performed via at least one of the plurality of interactive controls in a subsequent simulation to improve the performance scores;

following performance of the training scenario in the subsequent simulation, assigning and displaying, on the interface, a new performance score for each skill performed; and adapting the training scenario based on the new performance scores;

using k-means clustering to determine boundaries of phases of the sequential task;

obtaining a time sequence of segments based on the determined boundaries; and determining a set of metric functions, each metric function associated with a segment position on a segment.

12. The computer program product as set forth in claim 11, further comprising instructions for causing the one or more processors to further perform operations of:

processing a set of multi-dimensional data points with the k-means clustering algorithm;

using the set of metric functions and segment positions to compute performance scores along the segment positions.

13. The computer program product as set forth in claim 11, further comprising instructions for causing the one or more processors to further perform operations of:

learning a hierarchical task decomposition of the sequential task, wherein the hierarchical task decomposition comprises a hierarchical sequence of the phases of the sequential task and simulation variables, wherein the performance scores are associated with the hierarchical task decomposition; and receiving, as input, a knowledge graph comprising a plurality of layers of nodes representing operation of the machine, wherein each simulation variable is represented as a node with variable dependencies represented by arrows, and wherein the set of metric functions are associated with the knowledge graph.

14. The computer program product as set forth in claim 13, further comprising instructions for causing the one or more processors to further performs of:

using the task decomposition and the knowledge graph, determining one or more simulation variables that are relevant to a phase of the sequential task having a lowest performance score;

identifying a set of relevant simulation variables in the knowledge graph that have variable dependencies to the one or more determined simulation variables;

generating a collection of scenario types from the set of relevant simulation variables;

scoring and ranking the collection of scenario types; and generating a training scenario using a highest ranked scenario type.

\* \* \* \* \*